United States Patent
Tajima

(10) Patent No.: US 11,481,170 B2
(45) Date of Patent: Oct. 25, 2022

(54) IMAGE PROCESSING APPARATUS AND NON-TRANSITORY COMPUTER READABLE MEDIUM

(71) Applicant: FUJIFILM Business Innovation Corp., Tokyo (JP)

(72) Inventor: Shingo Tajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 150 days.

(21) Appl. No.: 16/228,783

(22) Filed: Dec. 21, 2018

(65) Prior Publication Data

US 2019/0205073 A1   Jul. 4, 2019

(30) Foreign Application Priority Data

Dec. 28, 2017   (JP) .............................. JP2017-252889

(51) Int. Cl.
  *G06F 3/12*   (2006.01)
  *H04N 1/00*   (2006.01)
  (Continued)

(52) U.S. Cl.
  CPC .......... *G06F 3/1256* (2013.01); *G06F 3/1208* (2013.01); *G06F 3/1285* (2013.01);
  (Continued)

(58) Field of Classification Search
  CPC .... H04N 5/3559; H04N 5/374; H04N 5/3745; H04N 1/6097; H04N 1/6011;
  (Continued)

(56) References Cited

U.S. PATENT DOCUMENTS

| 8,411,101 B2 | 4/2013 | Watanabe |
| 9,124,741 B2 | 9/2015 | Kowaka |

(Continued)

FOREIGN PATENT DOCUMENTS

| CN | 104135587 | 11/2014 |
| CN | 104427208 | 3/2015 |

(Continued)

OTHER PUBLICATIONS

"Office Action of Japan Counterpart Application", dated Jun. 22, 2021, with English translation thereof, p. 1-p. 6.

(Continued)

*Primary Examiner* — Darryl V Dottin
(74) *Attorney, Agent, or Firm* — JCIPRNET

(57) ABSTRACT

An image processing apparatus includes a first obtaining unit that obtains attribute information that specifies a process performed by an image forming apparatus in accordance with a print job including print data, a generation unit that generates a display image on the basis of the print data included in the print job, and a determination unit that determines a display color of a drawing area which corresponds to an area of a recording medium for printing the print data and in which a display image generated by the generation unit is to be disposed. If the attribute information specifies that a white color material be used, the determination unit determines the display color of the drawing area as a color other than white.

7 Claims, 37 Drawing Sheets

(51) Int. Cl.
*H04N 1/387* (2006.01)
*H04N 1/60* (2006.01)
*H04N 1/12* (2006.01)

(52) U.S. Cl.
CPC ....... *H04N 1/0044* (2013.01); *H04N 1/00724* (2013.01); *H04N 1/3871* (2013.01); *H04N 1/6011* (2013.01); *H04N 1/6097* (2013.01); *H04N 1/12* (2013.01)

(58) Field of Classification Search
CPC ............. H04N 1/00724; H04N 1/3871; H04N 1/0044; H04N 1/6008; H04N 1/23; H04N 1/12; H01L 27/14603; H01L 27/14665; H01L 27/1485; G06F 3/1256; G06F 3/1285; G06F 3/1208
USPC .......................................................... 358/2.1
See application file for complete search history.

(56) References Cited

U.S. PATENT DOCUMENTS

| | | | |
|---|---|---|---|
| 9,185,252 | B1 | 11/2015 | Kowaka |
| 10,656,773 | B2* | 5/2020 | Kashima ............... G06F 3/0485 |
| 2009/0225334 | A1* | 9/2009 | Takamiya ................ H04N 1/46 |
| | | | 358/1.9 |
| 2009/0249201 | A1 | 10/2009 | Watanabe |
| 2009/0279173 | A1* | 11/2009 | Chui ...................... G02B 5/223 |
| | | | 359/577 |
| 2011/0063641 | A1* | 3/2011 | Fukuda .................... H04N 1/54 |
| | | | 358/1.9 |
| 2012/0237667 | A1* | 9/2012 | Koyama ............... B41J 11/0015 |
| | | | 427/9 |
| 2015/0022830 | A1 | 1/2015 | Kwak et al. |
| 2015/0062602 | A1 | 3/2015 | Ono et al. |
| 2015/0110535 | A1* | 4/2015 | Kogusuri ........... G03G 15/6585 |
| | | | 399/341 |
| 2015/0370206 | A1* | 12/2015 | Hitosugi ............... G03G 15/065 |
| | | | 399/53 |
| 2017/0201648 | A1 | 7/2017 | Sugahara |

FOREIGN PATENT DOCUMENTS

| | | |
|---|---|---|
| JP | 2010114749 | 5/2010 |
| JP | 5071201 | 11/2012 |
| JP | 2015049257 | 3/2015 |

OTHER PUBLICATIONS

"Office Action of China Counterpart Application" with English translation thereof, dated Mar. 2, 2022, p. 1-p. 13.
Office Action of Japan Counterpart Application, with English translation thereof, dated Dec. 14, 2021, pp. 1-2.

* cited by examiner

FIG. 4

| PRINT JOB ID 410 | PRINT JOB NAME 420 | OWNER 430 | No. OF PAGES 440 | No. OF COPIES 450 | RECORDING MEDIUM SIZE 460 | PRINT DATA 470 | SPECIFIED COLOR MATERIALS 480 | RECORDING MEDIUM 490 | ... |
|---|---|---|---|---|---|---|---|---|---|
| 1 | PAMPHLET XX-1 | USER A | 16 | 50 | A4 | | | | |

FIG. 5

| 510 | 520 | 530 | 540 | 550 | |
|---|---|---|---|---|---|
| IMAGE FORMING APPARATUS ID | IMAGE FORMING APPARATUS NAME | COLOR MATERIAL TYPE | No. OF PAPER FEED UNITS | RECORDING MEDIUM | |
| | | | | 552 | 554 |
| | | | | RECORDING MEDIUM SIZE | RECORDING MEDIUM COLOR |
| | | | | | ⋮ |

500

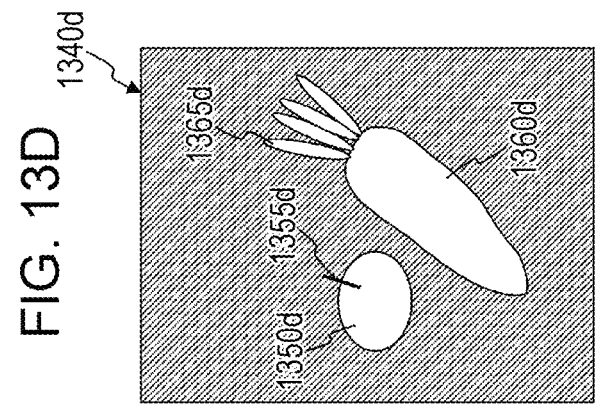
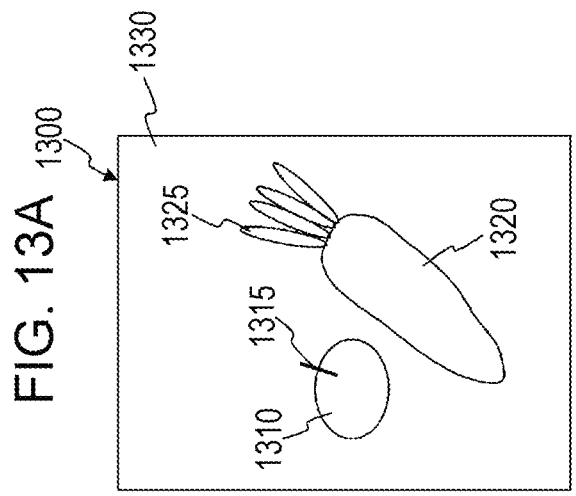
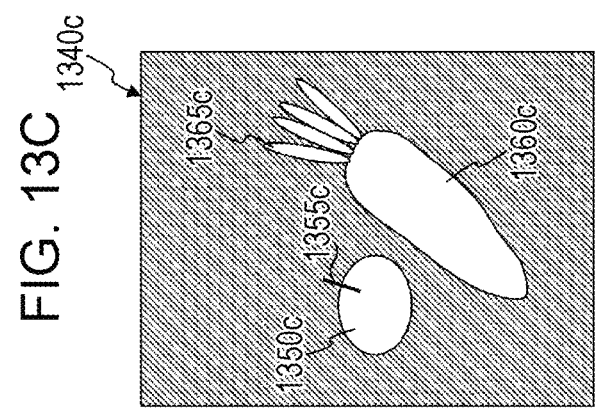
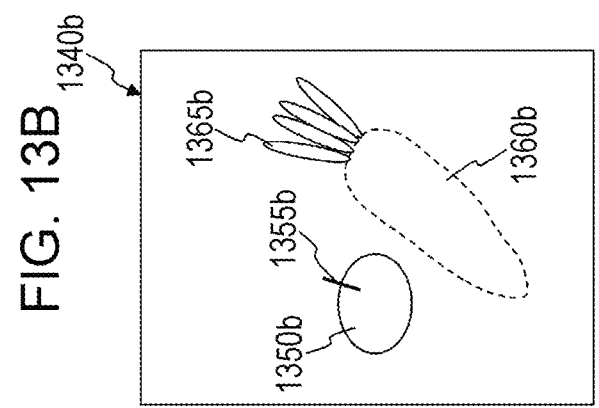

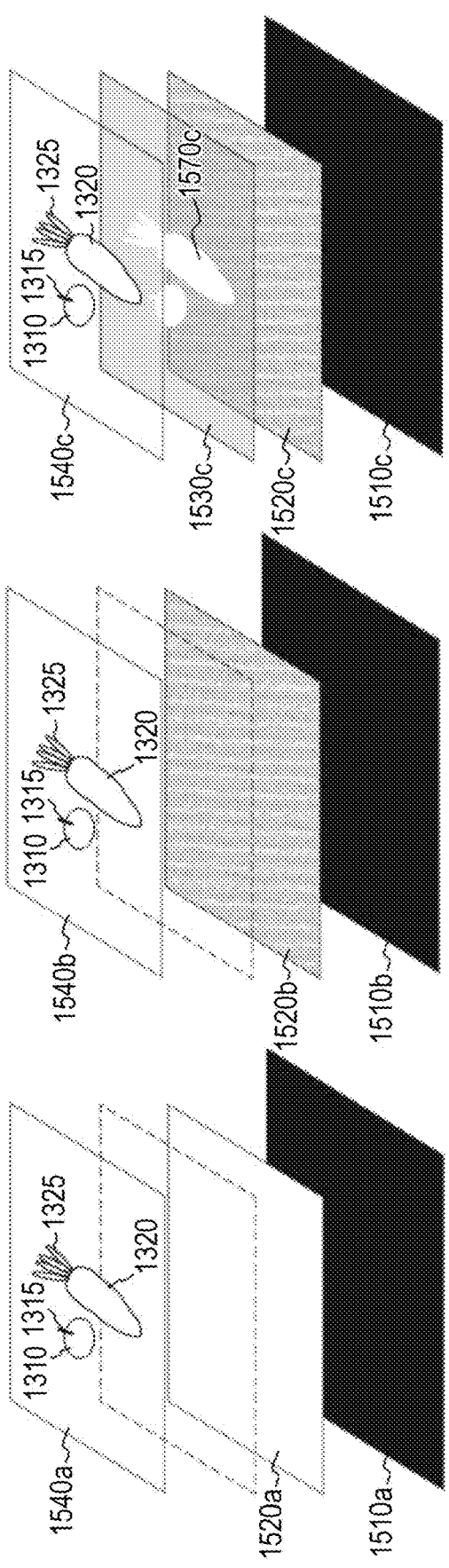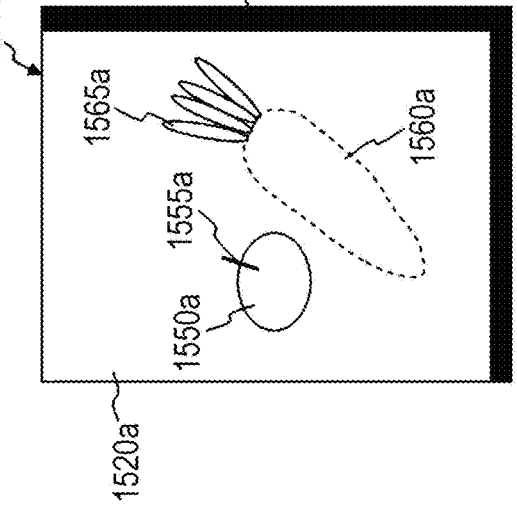

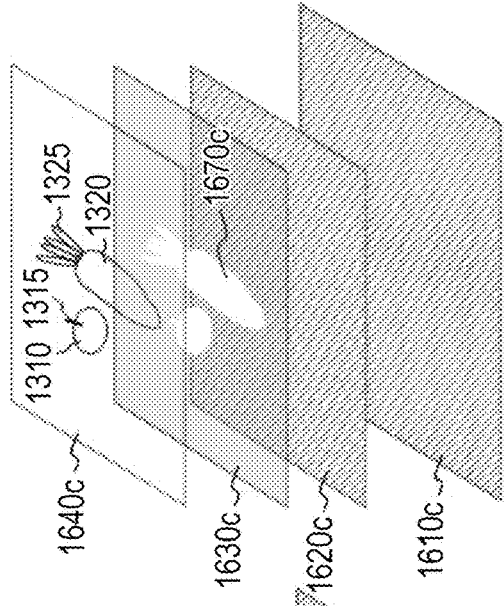
FIG. 16A1 RELATED ART
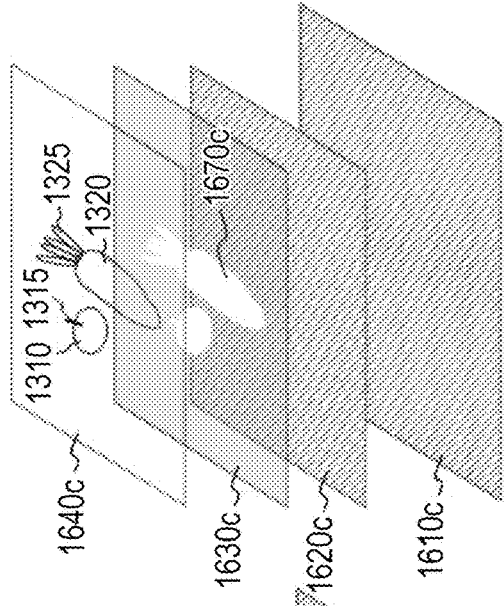
FIG. 16B1 RELATED ART
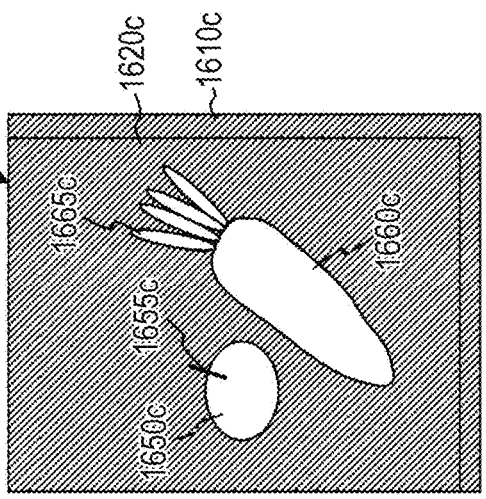
FIG. 16B2 RELATED ART
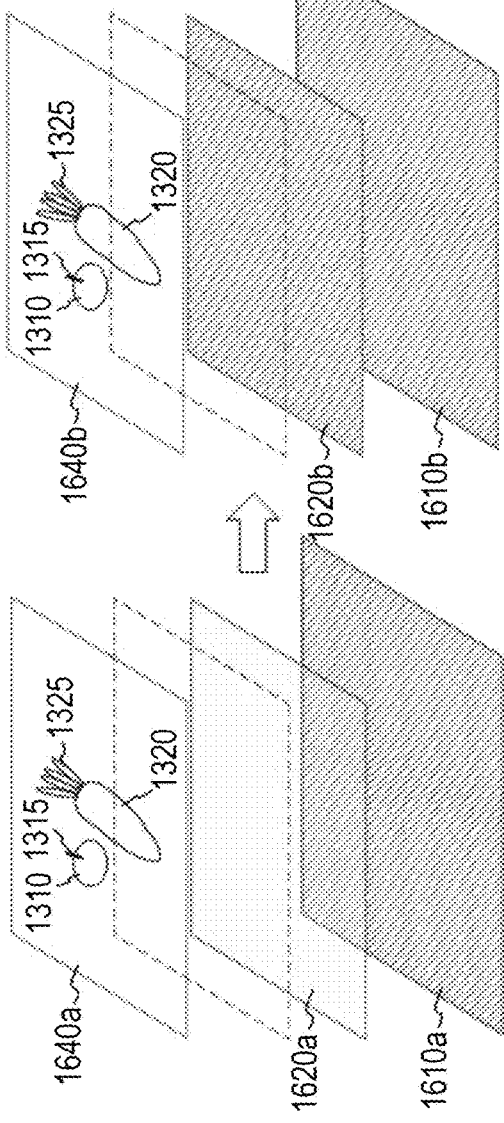
FIG. 16C1
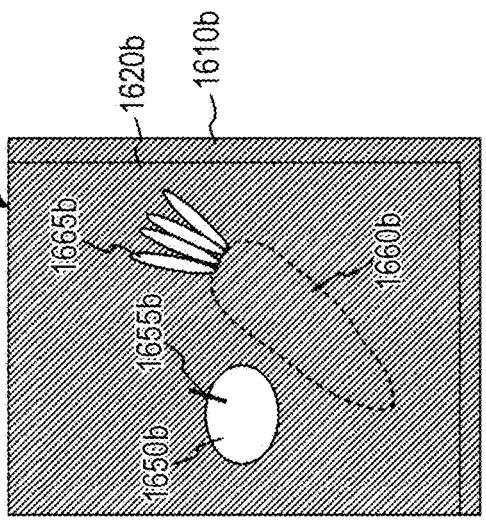
FIG. 16C2

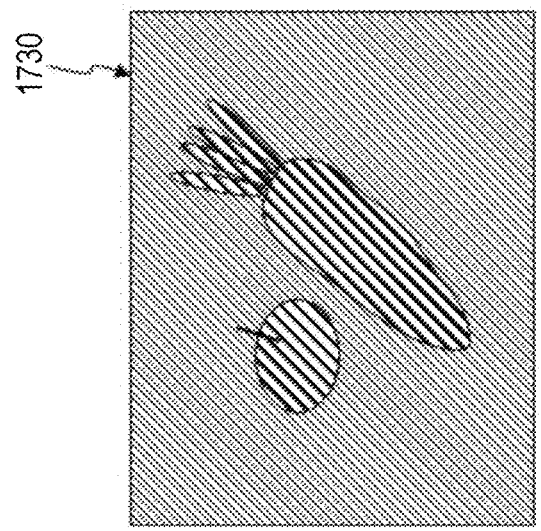
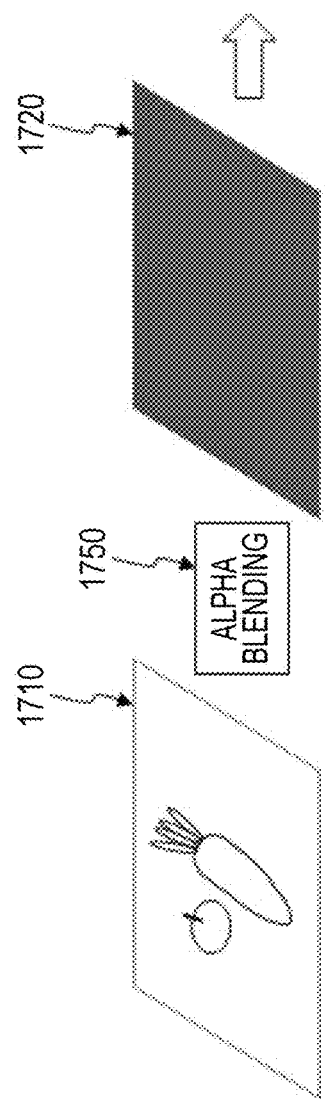
FIG. 17

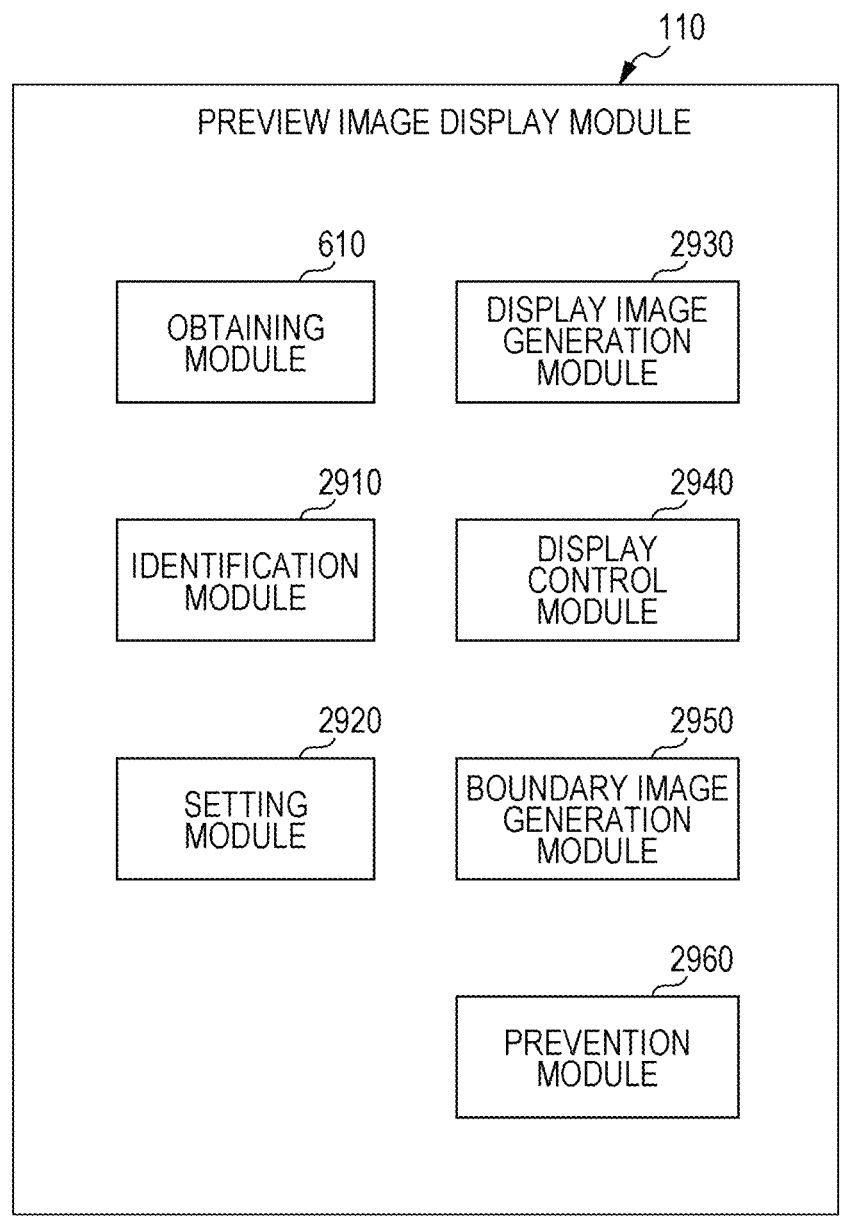

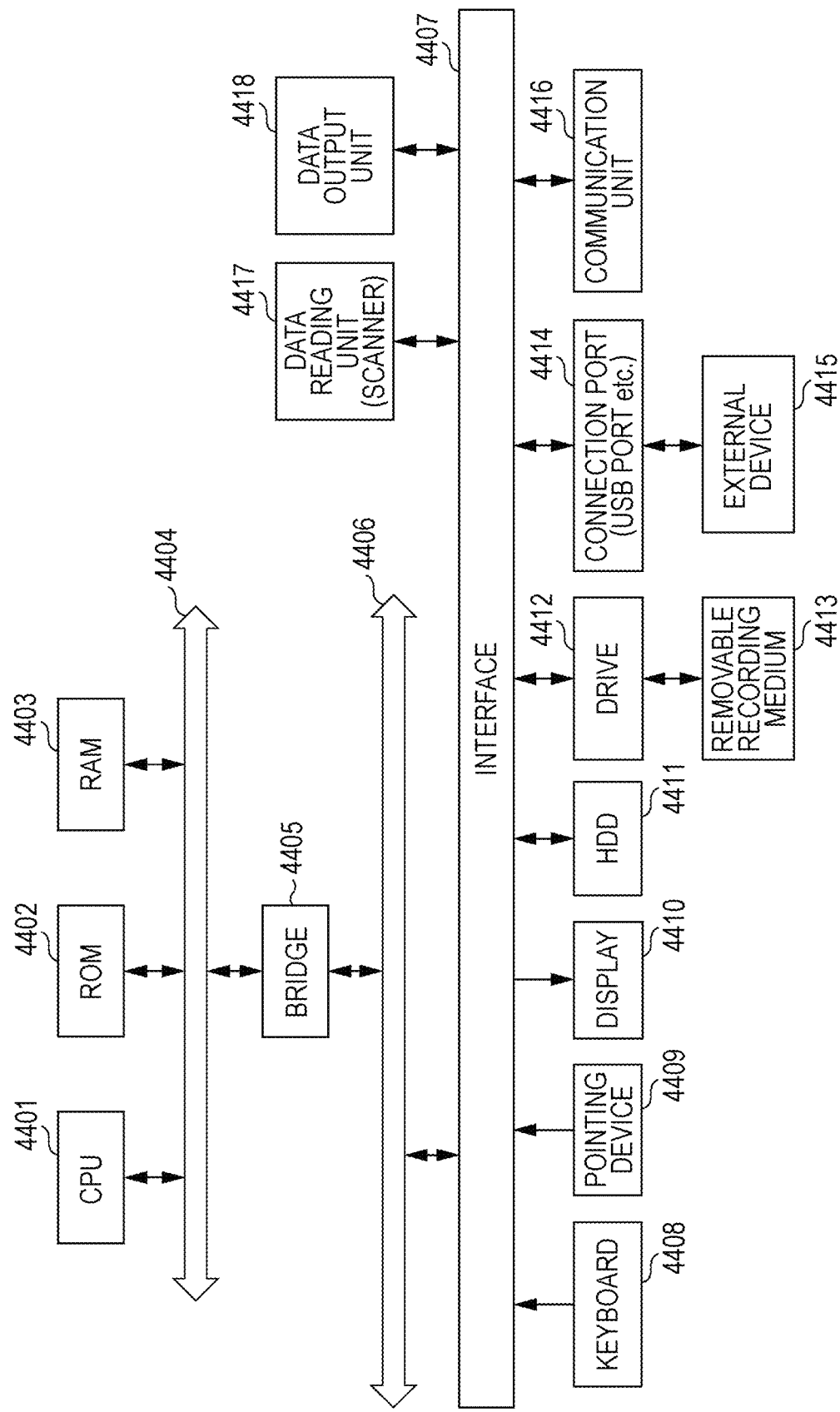

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-252889 filed Dec. 28, 2017.

BACKGROUND

Technical Field

The present invention relates to an image processing apparatus and a non-transitory computer readable medium.

SUMMARY

According to an aspect of the invention, there is provided an image processing apparatus including a first obtaining unit that obtains attribute information that specifies a process performed by an image forming apparatus in accordance with a print job including print data, a generation unit that generates a display image on the basis of the print data included in the print job, and a determination unit that determines a display color of a drawing area which corresponds to an area of a recording medium for printing the print data and in which a display image generated by the generation unit is to be disposed. If the attribute information specifies that a white Color material be used, the determination unit determines the display color of the drawing area as a color other than white.

BRIEF DESCRIPTION OF THE DRAWINGS

Exemplary embodiments of the present invention will be described in detail based on the following figures, wherein:

FIG. 4 is a diagram illustrating an example of the data structure of a print job table;

FIG. 5 is a diagram illustrating an example of the data structure of an image forming apparatus information table;

FIGS. 13A to 13D are diagrams illustrating examples of a process according to the first exemplary embodiment;

FIGS. 15A1 to 15C2 are diagrams illustrating examples of a process according to the first exemplary embodiment and the like;

FIGS. 16A1 to 16C2 are diagrams illustrating examples of a process according to the first exemplary embodiment and the like;

FIG. 17 is a diagram illustrating an example of blending;

FIG. 29 is a conceptual diagram illustrating an example of the configuration of modules according to a third exemplary embodiment;

FIG. 44 is a block diagram illustrating an example of the hardware configuration of a computer that achieves the exemplary embodiments.

DETAILED DESCRIPTION

Exemplary embodiments of the present invention will be described hereinafter with reference to the drawings.

Figure 1:
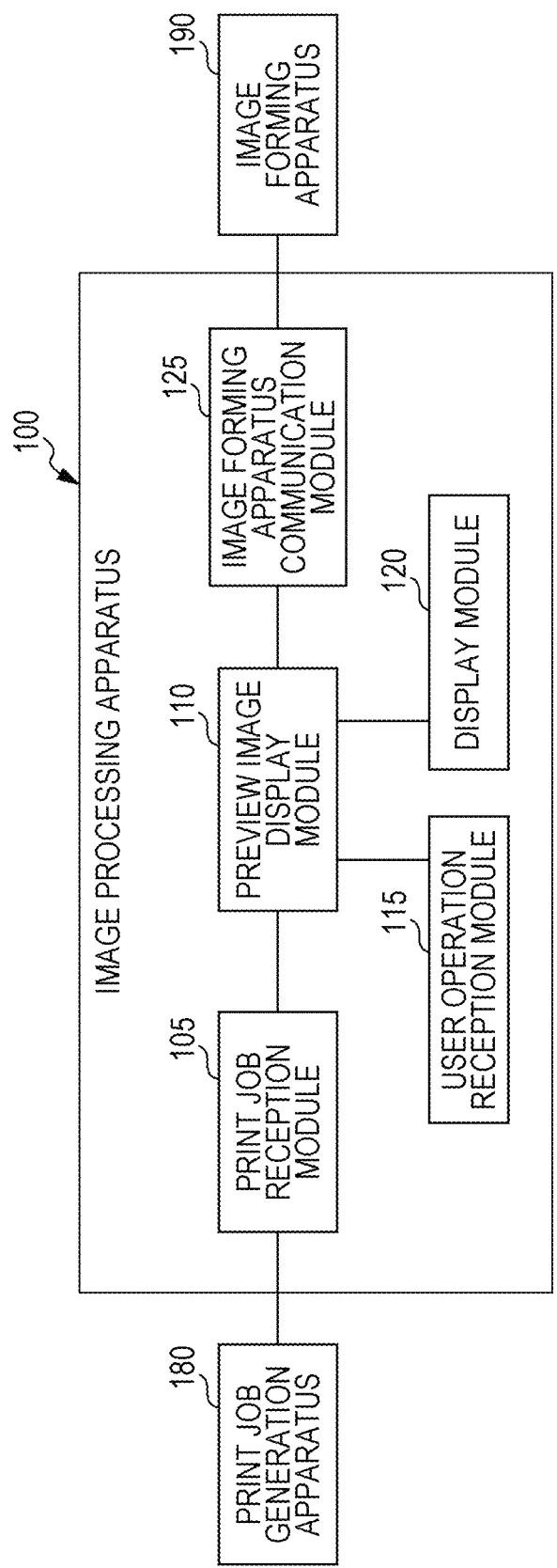
FIG. 1 is a conceptual diagram illustrating an example of the configuration of modules included in a system according to exemplary embodiments.

FIG. 1 is a conceptual diagram illustrating an example of the configuration of modules included in a system according to the exemplary embodiments.

The term "modules" generally refers to software (computer program) or hardware components logically separable from one another. That is, the modules in the exemplary embodiments may be not only modules achieved by computer programs but also modules included in a hardware configuration. The exemplary embodiments therefore also apply to a computer program (a program for causing a computer to perform steps, a program for causing a computer to function as units, or a program for causing a computer to achieve functions), a system, and a method for achieving these modules. Although "store", "stored" and other equivalent terms will be used for convenience of description, these terms mean that, when an exemplary embodiment implements the present invention as a computer program, the computer program is stored in a storage device or the storage device is controlled in such a way as to store the computer program. The modules may be in one-to-one correspondence with functions, but in practice, one module may be achieved by one program, plural modules may be achieved by one program, or one module may be achieved by plural programs. Plural modules may be executed by one computer, or one module may be executed by plural computers in distributed or parallel computing. One module may include another module. In the following description, a term "connection" will be used not only for a physical connection but also for a logical connection (communication of data, issuance of instructions, reference relationships of data, etc.). A term "predetermined" will be used when something is determined prior to a target process. The term "predetermined" will be used not only when something is determined prior to a process according to an exemplary embodiment but also when something is determined prior to a target step in accordance with a situation or a state at the time or a situation or a state so far, even if a process according to an exemplary embodiment has already started. When there are plural predetermined values, the values may be different from one another or two or more of the values (or all the values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and it is possible that only one of the items (e.g., only A) is selected.

A system or an apparatus may be achieved by plural computers, plural pieces of hardware, plural apparatuses, or the like connected to one another through a communication medium such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of plural processes performed by a module, and a result of the process is written to the storage device after the process is completed. Description of the reading of information before a process and the writing of a result to the storage device after a process might be omitted. The storage device may be a hard disk, a random-access memory (RAM), an external storage medium, a storage device through a communication line, a register of a central processing unit (CPU), or the like.

An image processing apparatus 100 is connected to a print job generation apparatus 180 and an image forming apparatus 190 and transfers a print job received from the print job generation apparatus 180 to the image forming apparatus 190. As illustrated in an example illustrated in FIG. 1, the image processing apparatus 100 includes a print job reception module 105, a preview image display module 110, a user operation reception module 115, a display module 120, and an image forming apparatus communication module 125. Although only one print job generation apparatus 180 and only one image forming apparatus 190 are connected to the image processing apparatus 100 in the example illustrated in FIG. 1, plural print job generation apparatuses 180 and plural image forming apparatuses 190 may be connected, instead.

The print job generation apparatus 180 is connected to the print job reception module 105 of the image processing apparatus 100. The print job generation apparatus 180 generates a print job and, in order to cause the image forming apparatus 190 to perform printing, transmits the print job to the image processing apparatus 100 (print job reception module 105). For example, a print job is generated as a result of a print operation performed by a user and transmitted to the image processing apparatus 100.

The image processing apparatus 100 receives a print job from the print job generation apparatus 180 and transfers the print job to the image forming apparatus 190 in accordance with a print schedule. The image processing apparatus 100 also displays, on a display device such as a liquid crystal display, an image to be printed by the print job to allow the user to check and adjust tones and the like. That is, the image processing apparatus 100 produces the same effect as trial printing on the display device. It is therefore desirable for the display device to display an image with the same tones as on a recording medium (also referred to as a "sheet" or a "medium"). A color of a recording medium is also called a "medium color".

The image forming apparatus 190 is connected to the image forming apparatus communication module 125 of the image processing apparatus 100. The image forming apparatus 190 performs a print process on the basis of a print job received from the image processing apparatus 100 (image forming apparatus communication module 125). The exemplary embodiments are suitable especially when a color material (generally a toner) called a "special color" (also referred to as a "specific color", a "spot color", or the like) different from basic recording colors is available in the image forming apparatus 190. Color materials are generally toners but may be inks. The basic recording colors are generally cyan (C), magenta (M), yellow (Y), and black (K). Alternatively, the basic recording colors may be cyan, magenta, and yellow. In the following description, cyan, magenta, yellow, and black will be used as an example of the basic recording colors. The special color different from the basic recording colors is a color different from cyan, magenta, yellow, and black (or a color different from cyan, magenta, and yellow), namely, for example, white, silver, gold, or the like.

The print job reception module 105 is connected to the print job generation apparatus 180 and the preview image display module 110. The print job reception module 105 receives a print job from the print job generation apparatus 180 and transfers the print job to the preview image display module 110. The received print job includes print data and the number of copies to be printed. The print job reception module 105 receives, for example, a print job table 400. FIG. 4 is a diagram illustrating an example of the data structure of the print job table 400. The print job table 400 includes a print job identifier (ID) field 410, a print job name field 420, an owner field 430, a number of pages field 440, a number of copies field 450, a recording medium size field 460, a print data field 470, a specified color materials field 480, and a recording medium field 490. The print job ID field 410 stores information (print job ID) for uniquely identifying a print job in the exemplary embodiments. The print job name field 420 stores a name of the print job. The owner field 430 stores an owner of the print job. The owner herein refers to an owner of a print to be obtained as a result of the print job. Alternatively, the owner may refer to a person who has issued the print job. The number of pages field 440 stores the number of pages of a document subjected to the print job. The number of copies field 450 stores the number of copies to be printed as a result of the print job. The recording medium size field 460 stores the size (A4 or the like) of a recording medium. The print data field 470 stores print data. The print data may be a portable document format (PDF), image data, or the like. The specified color materials field 480 stores specified color materials to be used by the image forming apparatus 190 for the print job. In the specified color materials field 480, (1) color materials to be used in printing may be specified or (2) a color material (B) may be specified for a color (A) included in the print data. In the case of (2), for example, a white color material might be specified for a color of white included in print data. The recording medium field 490 stores a type of recording medium to be used for printing. In the recording medium field 490, a type of recording medium (e.g., includes a color and a material of the recording medium) to be used for printing is specified.

The preview image display module 110 is connected to the print job reception module 105, the user operation reception module 115, the display module 120, and the image forming apparatus communication module 125. The preview image display module 110 causes the display module 120 to display, on the display device, print data included in a print job received from the print job reception module 105. At this time, the preview image display module 110 may change an image to be displayed in accordance with a user operation received by the user operation reception module 115.

The user operation reception module 115 is connected to the preview image display module 110. The user operation reception module 115 receives a user operation through a mouse, a keyboard, or the like and transfers information regarding the operation (e.g., an instruction to change tones, etc.) to the preview image display module 110. The user operation reception module 115 may also receive a user operation (may be a line of sight, a gesture, and a speech sound) through a camera, a microphone, or the like.

The display module 120 is connected to the preview image display module 110. The display module 120 displays print data included in a print job on the display device in accordance with a control operation performed by the preview image display module 110. The display module 120 may also present a message to the user as a sound from a speaker or a tactile sensation from a tactile device.

In addition, a liquid crystal display that also serves as a touch panel may be used as the user operation reception module 115 and the display module 120. The liquid crystal display may receive a user operation and display an image for the user.

The image forming apparatus communication module 125 is connected to the preview image display module 110 and the image forming apparatus 190. The image forming apparatus communication module 125 transfers a print job to the image forming apparatus 190 in accordance with a print schedule. The preview image display module 110 might have adjusted tones for the print job. The image forming apparatus 190 is managed, for example, using an image forming apparatus information table 500. FIG. 5 is a diagram illustrating an example of the data structure of the image forming apparatus information table 500. The image forming apparatus information table 500 includes an image forming apparatus ID field 510, an image forming apparatus name field 520, a color material type field 530, a number of paper feed units field 540, and recording medium fields 550. Each recording medium field 550 includes a recording medium size field 552 and a recording medium color field 554. In the exemplary embodiments, the image forming apparatus ID field 510 stores information (image forming apparatus ID) for uniquely identifying the image forming apparatus 190. The image forming apparatus name field 520 stores a name of the image forming apparatus 190. The color material type field 530 stores a type of color material included (includable) in the image forming apparatus 190. The type of color material may be, for example, a type of color material of the above-mentioned special color. The number of paper feed units field 540 stores the number of paper feed units included in the image forming apparatus 190. The recording medium fields 550 as many as the number of paper feed units follow the number of paper feed units field 540. The recording medium fields 550 each store an attribute of a recording medium stored in a corresponding paper feed unit. The recording medium size fields 552 each store the size of a recording medium, which is, for example, A4 or the like. The recording medium color fields 554 each store a color of a recording medium, which is, for example, white, red, or the like. Alternatively, a material of the recording medium may be stored instead of a color. The image forming apparatus information table 500 can be accessed by the preview image display module 110.

Figure 2:
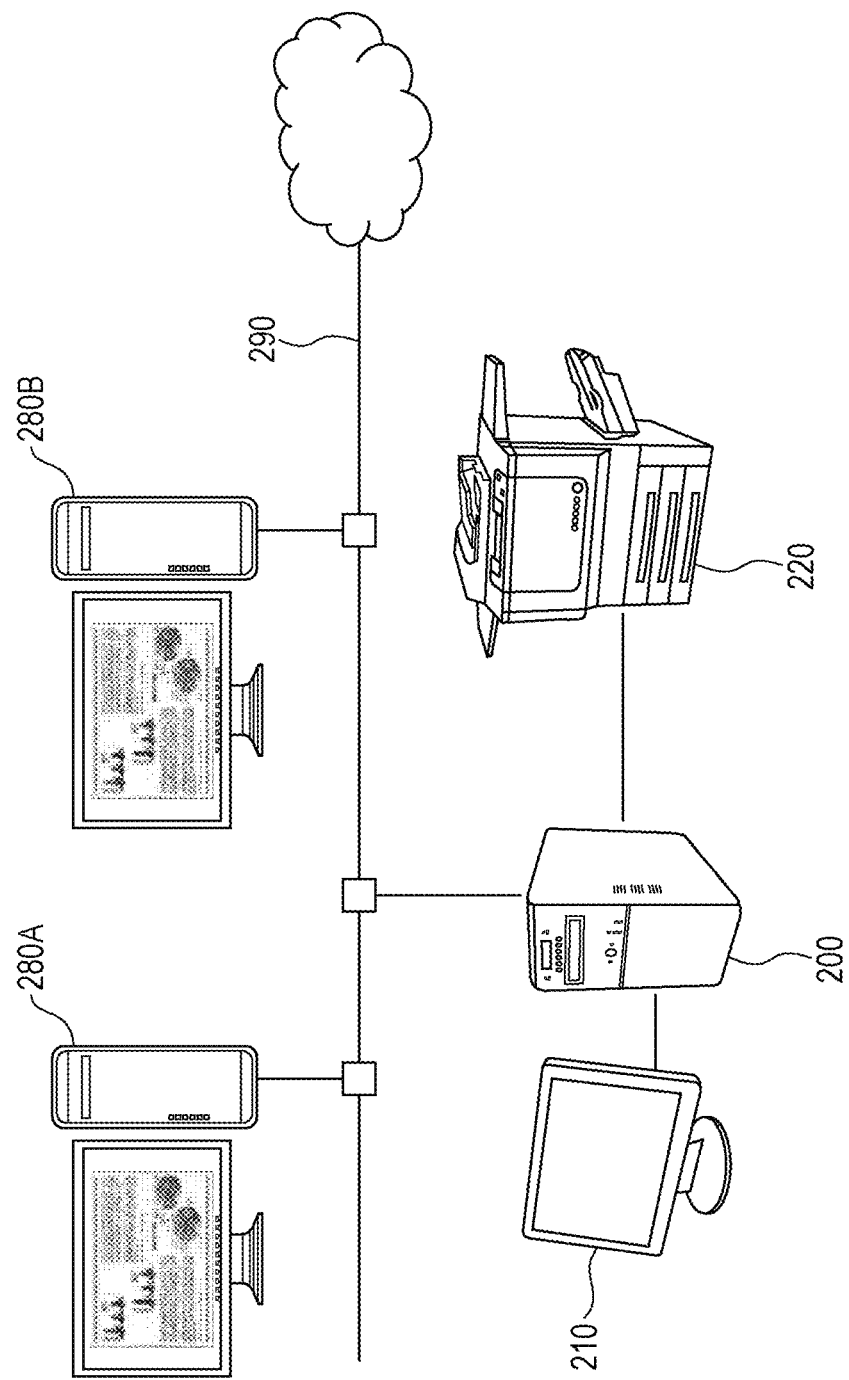
FIG. 2 is a diagram illustrating an example of the configuration of a system according to the exemplary embodiments.

FIG. 2 is a diagram illustrating an example of the configuration of a system according to the exemplary embodiments.

This is an example in which the print job generation apparatus 180 is constructed in user terminals 280A and 280B, the image processing apparatus 100 is constructed in a print server 200, and the image forming apparatus 190 is achieved as a printing apparatus 220. In this example, the display module 120 displays images and the like on a display device 210.

The print server 200 is connected to the display device 210 and the printing apparatus 220. The print server 200 is also connected to the user terminals 280A and 280B through a communication line 290. The communication line 290 may be of a wireless or wired type or a combination of the two, and may be, for example, the Internet or an intranet as a communication infrastructure. Functions of the print server 200 may be achieved as a cloud service.

The display device 210 is a liquid crystal display or the like connected to the print server 200. The display module 120 draws images and the like for the display device 210. The printing apparatus 220 is connected to the print server 200. The user terminals 280A and 280B are operated by the user to generate print jobs, which are then transmitted to the print server 200 through the communication line 290.

Figure 3:
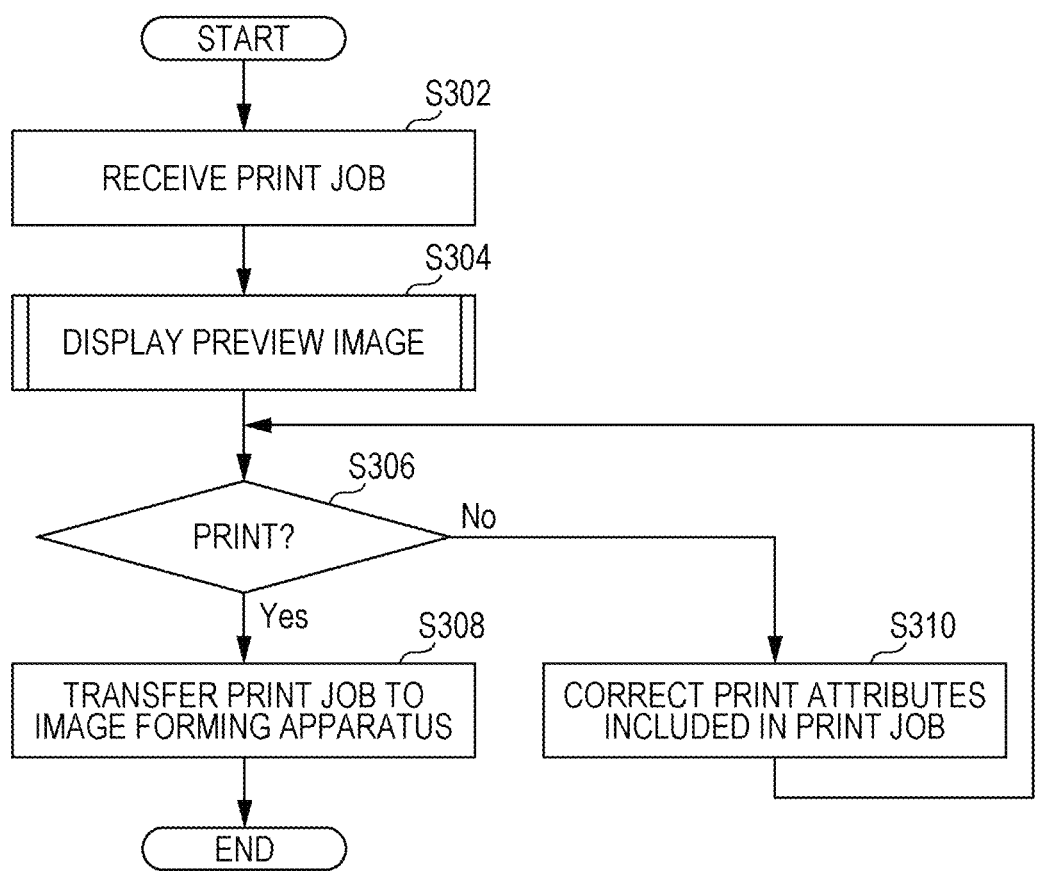
FIG. 3 is a flowchart illustrating an example of a process performed by the system according to the exemplary embodiments.

FIG. 3 is a flowchart illustrating an example of a process performed by the system according to the exemplary embodiments.

In step S302, the print job reception module 105 receives a print job.

In step S304, the preview image display module 110 displays a preview image. Details of step S304 will be described later in first to fourth exemplary embodiments.

In step S306, the preview image display module 110 determines whether to perform printing in accordance with a user operation. If so, the process proceeds to step S308, and if not, the process proceeds to step S310.

In step S308, the image forming apparatus communication module 125 transfers the print job to the image forming apparatus 190.

In step S310, the preview image display module 110 corrects print attributes (e.g., tones etc.) included in the print job in accordance with a user operation. The process then returns to step S306.

First Exemplary Embodiment

Figure 6:
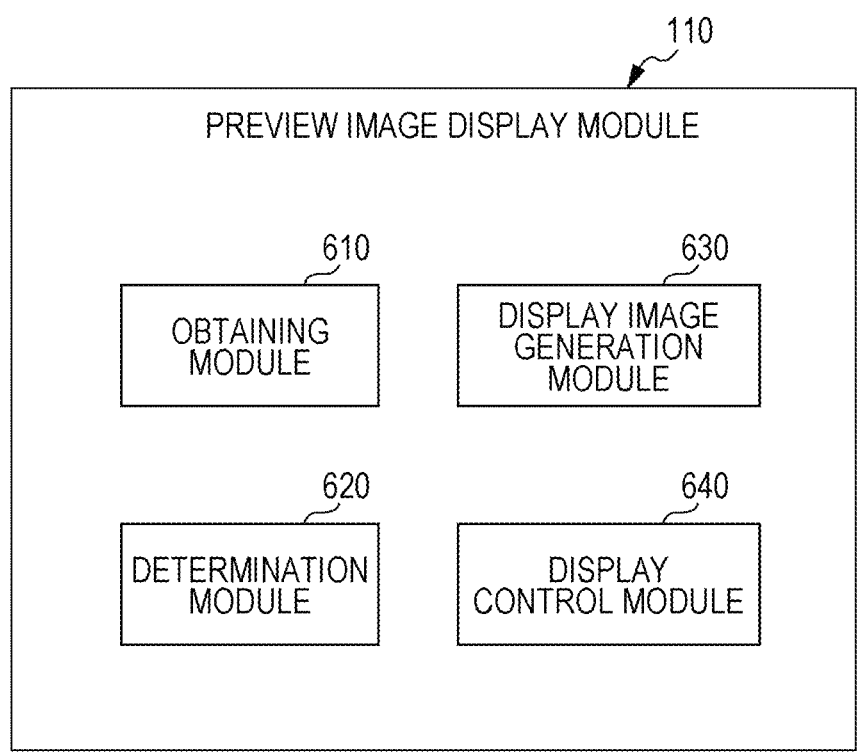
FIG. 6 is a conceptual diagram illustrating an example of the configuration of modules included in a system according to a first exemplary embodiment.

FIG. 6 is a conceptual diagram illustrating an example of the configuration of modules included in a system according to the first exemplary embodiment.

The preview image display module 110 includes an obtaining module 610, a determination module 620, a display image generation module 630, and a display control module 640.

The obtaining module 610 obtains attribute information that specifies a process performed by the image forming apparatus 190 in accordance with a print job including print data. It is needless to say that the print job has been received by the print job reception module 105. The attribute information is the property of the print job and includes, for example, the print job table 400.

The obtaining module 610 may also obtain a color of a recording medium specified by the attribute information. For example, the obtaining module 610 obtains a color of a recording medium from the recording medium field 490 of the print job table 400.

The determination module 620 determines a display color of a drawing area which corresponds to an area of a recording medium for printing print data and in which a display image generated by the display image generation module 630 is to be disposed. Here, the drawing area which corresponds to an area of a recording medium for printing print data and in which a display image generated by the display image generation module 630 is to be disposed refers to an area in which a ground of the recording medium is exposed and no images are drawn on the basis of the print data. This area will also be referred to as an "achromatic part". Since this is the area in which no images are drawn on the basis of the print data, the achromatic part is not even an area in which white is applied on the basis of the print data, much less an area in which colors other than white are applied on the basis of the print data. That is, a so-called "blank" is an area in which white is applied and is not an achromatic part.

When the attribute information specifies that a white color material be used, the determination module 620 determines the display color of the drawing area as a color other than white. For example, a color predetermined by the determination module 620 may be black.

When a white color material is available in the image forming apparatus 190, the determination module 620 may determine the display color of the drawing area as a color other than white. Whether a white color material is available in the image forming apparatus 190 may be determined, for example, by referring to the image forming apparatus information table 500 or by communicating with the image forming apparatus 190 and checking available color materials.

When the attribute information specifies that a white color material be used for white print data, the determination module 620 may determine the display color of the drawing area as a color other than white. If the determination module 620 determines the display color of the drawing area as a color other than white, the determined color may be the predetermined color.

Alternatively, the determination module 620 may determine the display color of the drawing area as a color of a recording medium. The color of the recording medium is a color obtained by the obtaining module 610. That is, an image displayed on the display device 210 reflects the color of the recording medium.

When the recording medium is white (e.g., a so-called "white sheet"), the determination module 620 may determine the display color of the drawing area as a color other than white for a print job in which a white color material is used. The color other than white may be a color that is distinctly different from white, such as black, or may be a color similar to white, such as pale gray.

The display image generation module 630 generates a display image on the basis of print data included in a print job. The display image generation module 630 may generate an image simply on the basis of print data, or may simulate colors of an image on a print. Because a user sees a color of a recording medium and various color materials overlapping one another when looking at a print, the display device 210 needs to simulate these colors on the display device 210. For this simulation, color blending needs to be performed. An example of the color blending is alpha blending, which will be described with reference to FIGS. 17 and 18. The display control module 640 may perform the color blending.

The display control module 640 controls the display module 120 such that the display device 210 displays the display image generated by the display image generation module 630.

Figure 7:
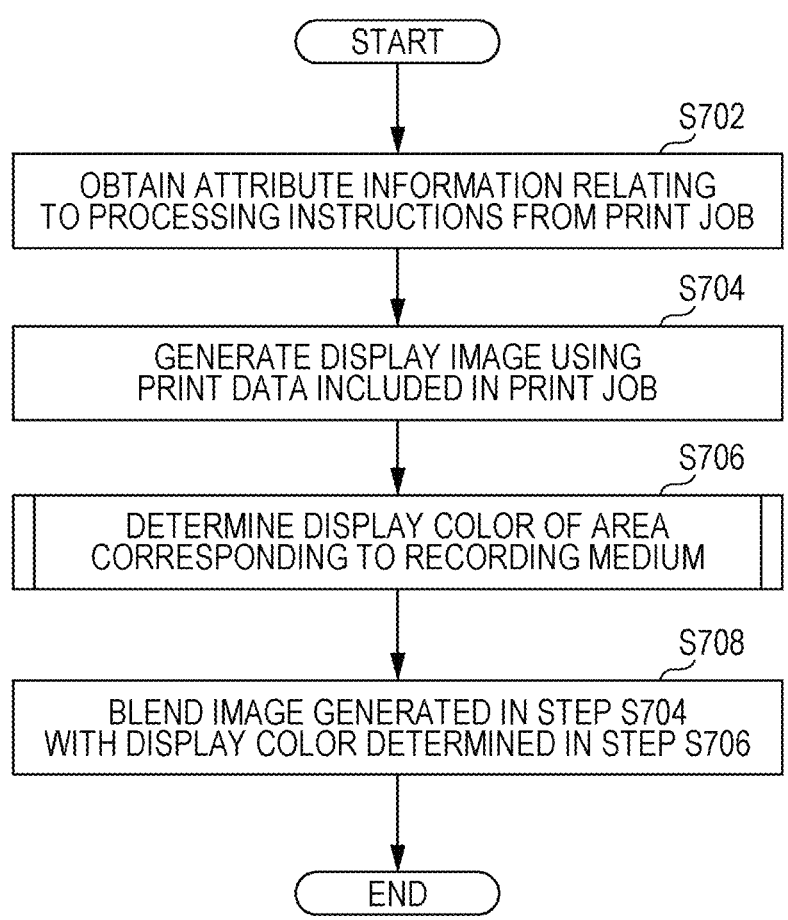
FIG. 7 is a flowchart illustrating an example of a process according to the first exemplary embodiment.

FIG. 7 is a flowchart illustrating an example of a process according to the first exemplary embodiment.

In step S702, the obtaining module 610 obtains attribute information relating to processing instructions from a print job. For example, the obtaining module 610 may obtain the attribute information from the specified color materials field 480 or the recording medium field 490 of the print job table 400.

In step S704, the display image generation module 630 generates a display image using print data included in the print job.

In step S706, the determination module 620 determines a display color of an area corresponding to a recording medium. The display color of an area corresponding to a recording medium refers to the above-mentioned achromatic part, that is, a part in which a color of the recording medium is visible on the display device 210. Details of step S706 will be described later with reference to flowcharts of FIGS. 8 to 12. One of processes illustrated in FIGS. 8 to 12 may be performed, or a combination of some of these processes may be performed.

In step S708, the display control module 640 blends the image generated in step S704 with the display color determined in step S706. A known method such as alpha blending, for example, may be used for the blending.

Figure 8:
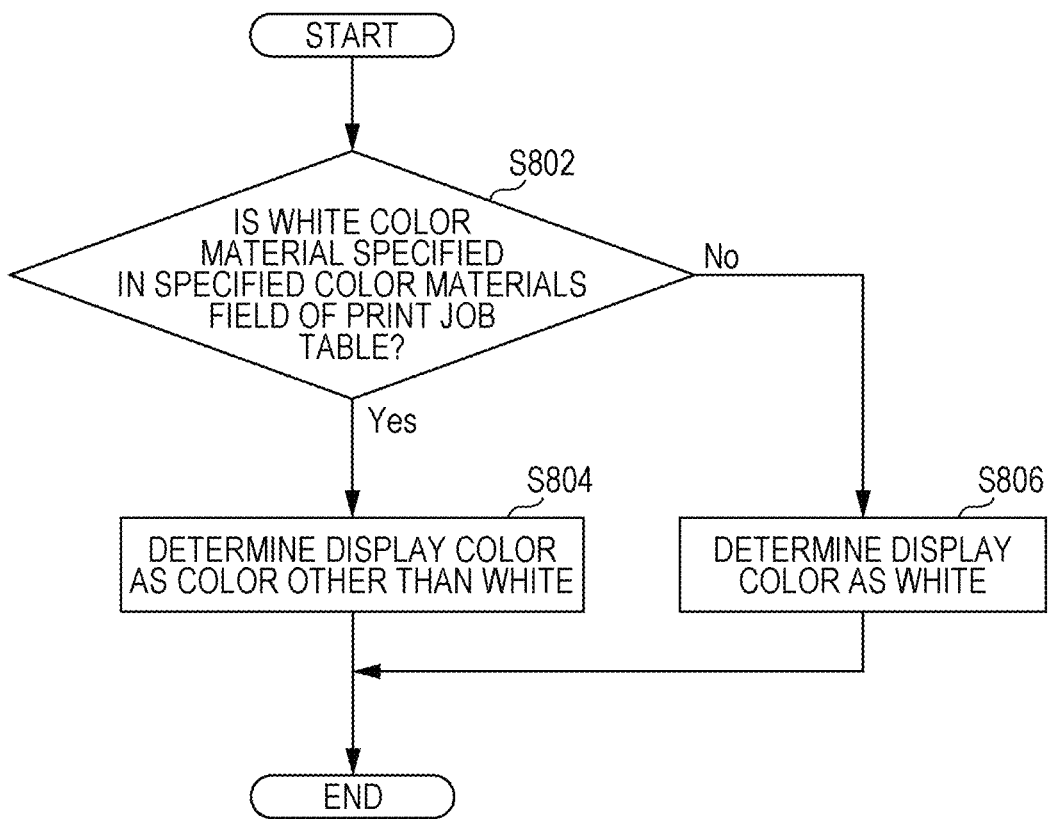
FIG. 8 is a flowchart illustrating an example of a process according to the first exemplary embodiment.

FIG. 8 is a flowchart illustrating an example of a process (an example of step S706) according to the first exemplary embodiment.

In step S802, it is determined whether a white color material is specified in the specified color materials field 480 of the print job table 400. If so, the process proceeds to step S804, and if not, the process proceeds to step S806.

In step S804, the display color is determined as a color other than white. For example, the display color may be black. That is, the user can see, on the display device 210, a print obtained by printing an image on a black sheet. As a result, when the white color material is used, the user can check where the white color material is applied. In this process, a color of an achromatic part is determined without taking into consideration the color of the recording medium. That is, the color of the achromatic part is determined only on the basis of whether a white color material is used. The user can therefore see, on the display device 210, a print obtained by printing an image on a black sheet not only when the print job specifies that a white color material be used on a white sheet but also when the print job specifies that a white color material be used on a red sheet.

In step S806, the display color is determined as white. When the recording medium is not white, the color of the recording medium may be determined as the display color (equivalent to a case where step S806 is "determine the display color as the color of the recording medium"). In this case, the user can see an image closer to an actual print on the display device 210. The same holds for steps "determine the display color as white" (e.g., step S908, etc.) in the following flowcharts (except for the flowchart of FIG. 11).

Figure 9:
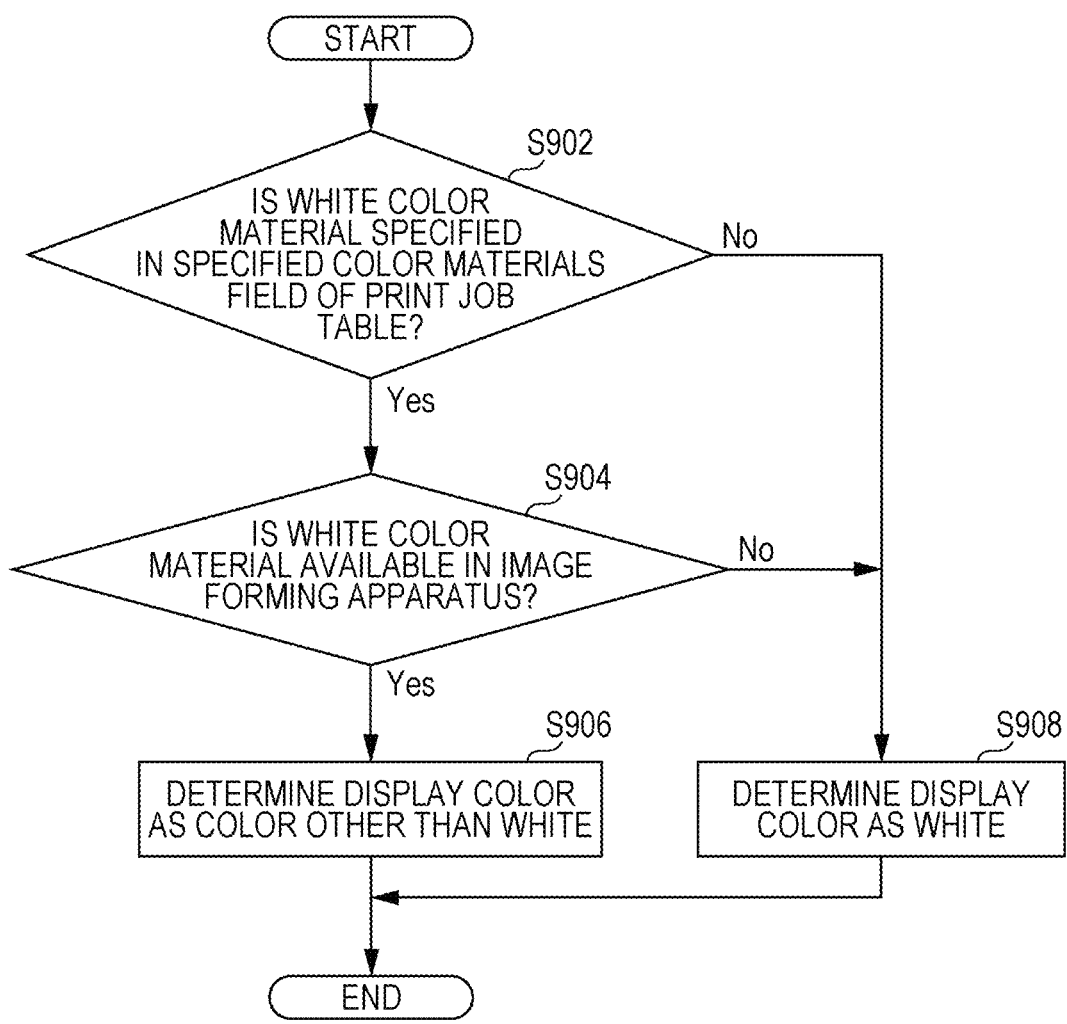
FIG. 9 is a flowchart illustrating another example of the process according to the first exemplary embodiment.

FIG. 9 is a flowchart illustrating another example of the process (an example of step S706) according to the first exemplary embodiment.

In step S902, it is determined whether a white color material is specified in the specified color materials field 480 of the print job table 400. If so, the process proceeds to step S904, and if not, the process proceeds to step S908.

In step S904, it is determined whether a white color material is available in the image forming apparatus 190. If so, the process proceeds to step S906, and if not, the process proceeds to step S908. That is, even when a white color material is specified in the print job, the display color need not be determined as a color other than white if the white color material is not available in the image forming apparatus 190.

In step S906, the display color is determined as a color other than white. For example, the display color may be black.

In step S908, the display color is determined as white.

Figure 10:
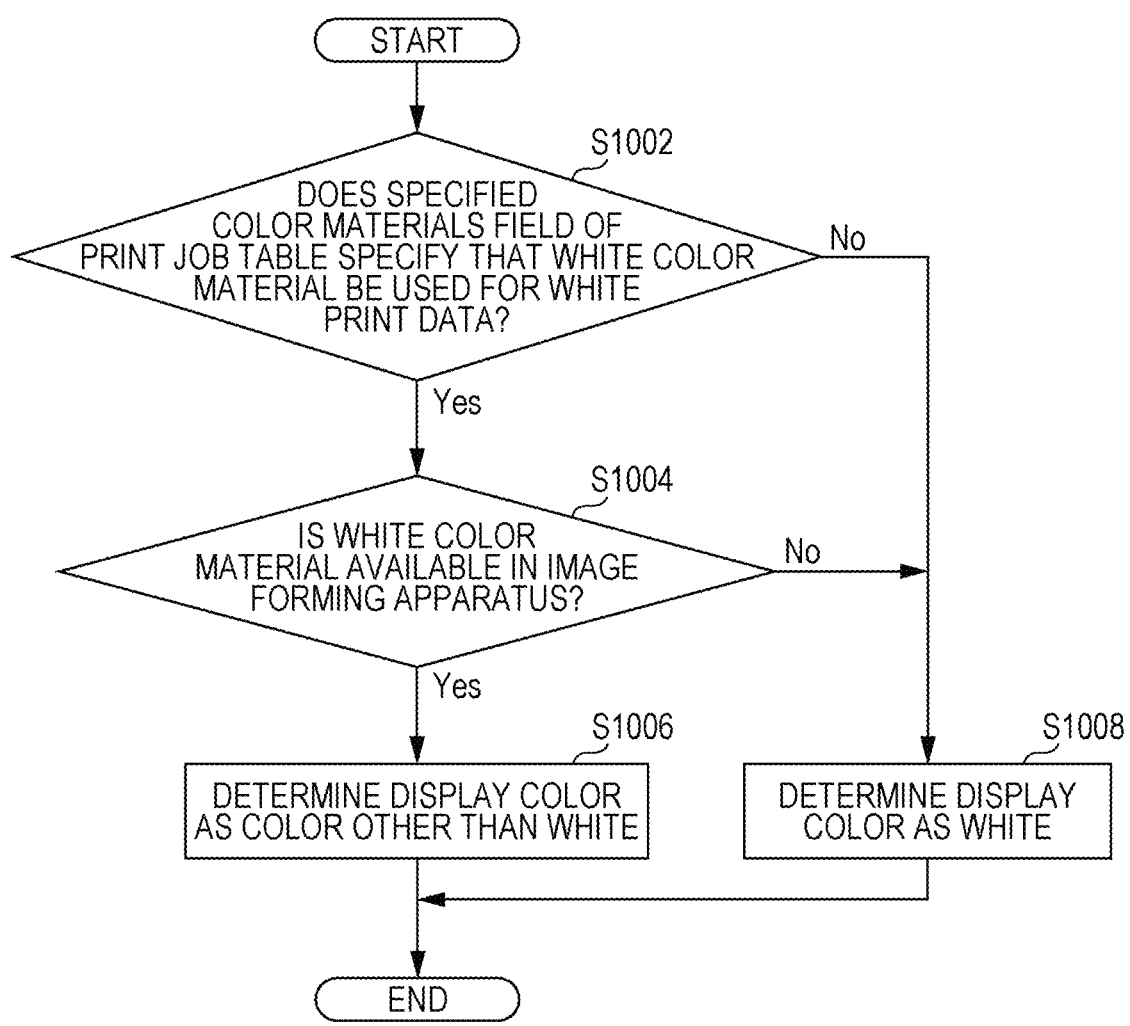
FIG. 10 is a flowchart illustrating another example of the process according to the first exemplary embodiment.

FIG. 10 is a flowchart illustrating another example of the process (an example of step S706) according to the first exemplary embodiment.

In step S1002, it is determined whether the specified color materials field 480 of the print job table 400 specifies that a white color material be used for white print data. If so, the process proceeds to step S1004, and if not, the process proceeds to step S1008. Whereas whether a white color material is specified is determined in the example illustrated in FIG. 9, whether it is specified that a white color material be used for white print data is determined here.

In step S1004, it is determined whether the white color material is available in the image forming apparatus 190. If so, the process proceeds to step S1006, and if not, the process proceeds to step S1008.

In step S1006, the display color is determined as a color other than white. For example, the display color may be black.

In step S1008, the display color is determined as white.

Figure 11:
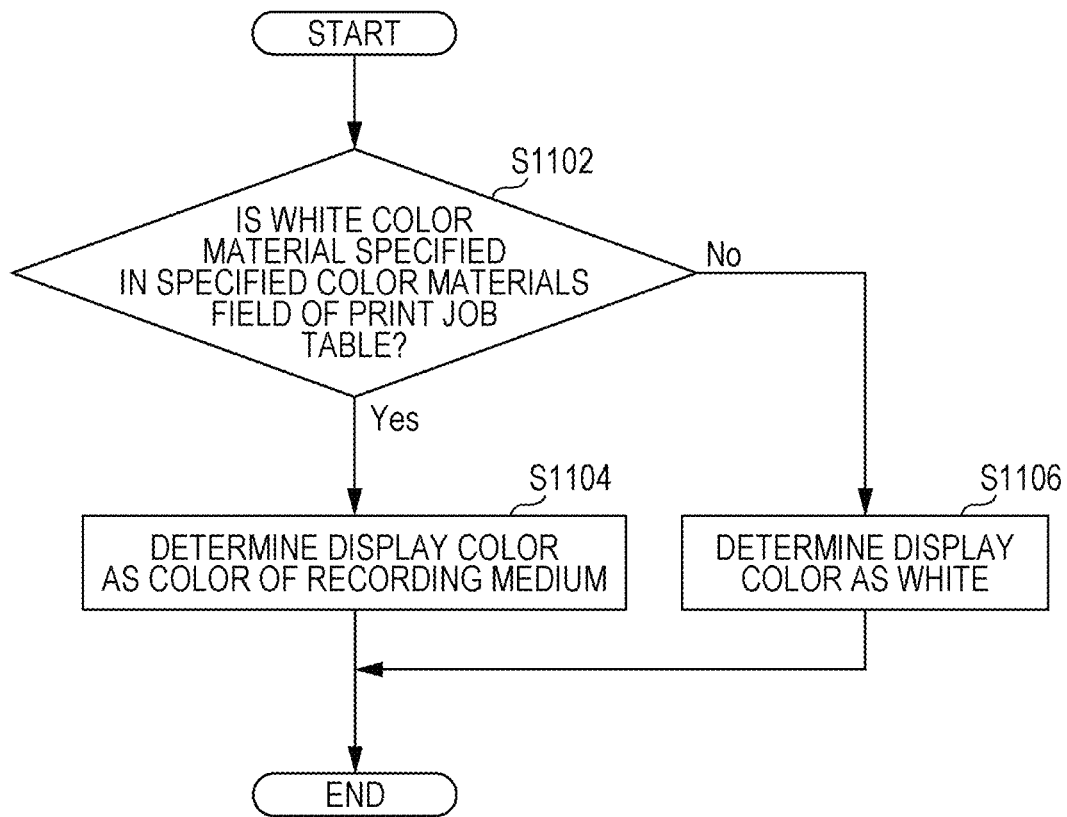
FIG. 11 is a flowchart illustrating another example of the process according to the first exemplary embodiment.

FIG. 11 is a flowchart illustrating another example of the process (an example of step S706) according to the first exemplary embodiment.

In step S1102, it is determined whether a white color material is specified in the specified color materials field 480 of the print job table 400. If so, the process proceeds to step S1104, and if not, the process proceeds to step S1106.

In step S1104, the display color is determined as the color of the recording medium. When the recording medium is not white, the user can check, on the display device 210, where the white color material is used. When the recording medium is white, it is difficult for the user to check where the white color material is used, but the user can see an image closer to an actual print.

In step S1106, the display color is determined as white. In this process, when a white color material is not specified, the color of the achromatic part is forcibly determined as white.

Figure 12:
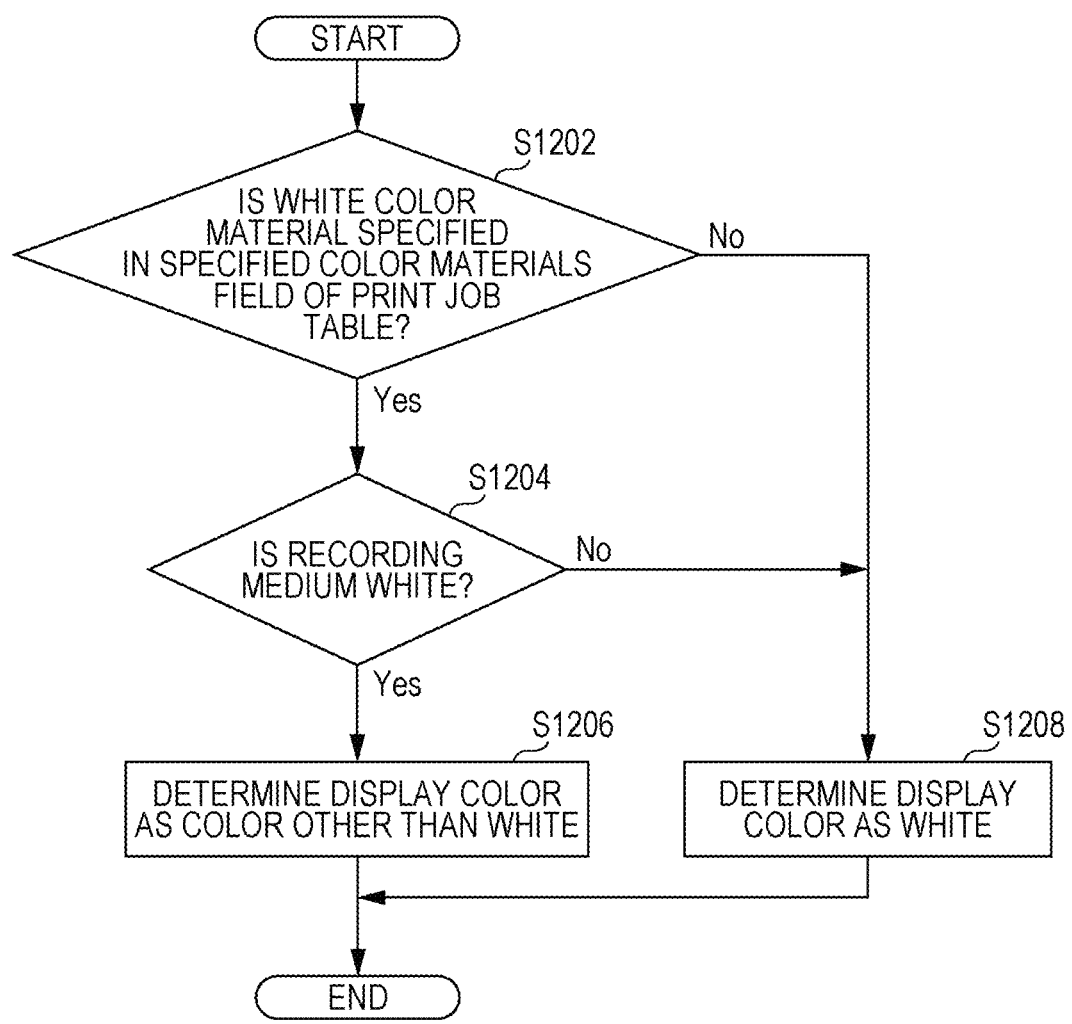
FIG. 12 is a flowchart illustrating another example of the process according to the first exemplary embodiment.

FIG. 12 is a flowchart illustrating another example of the process (an example of step S706) according to the first exemplary embodiment.

In step S1202, it is determined whether a white color material is specified in the specified color materials field 480 of the print job table 400. If so, the process proceeds to step S1204, and if not, the process proceeds to step S1208.

In step S1204, whether the recording medium is white is determined. If so, the process proceeds to step S1206, and if not, the process proceeds to step S1208. Unlike in the process illustrated in FIG. 8 or the like, the color of the achromatic part is determined in consideration of the color of the recording medium.

In step S1206, the display color is determined as a color other than white. For example, the display color may be black. As a result, when the white color material is used on a white sheet, the user can check where the white color material is used. In this process, the color of the achromatic part is determined in consideration of the color material used and the color of the recording medium. That is, the color of the achromatic part is determined as a color other than white if a white color material is used and the recording medium is white. As a result, even when an image is printed on a white sheet, the user can check where the white color material is used.

In step S1208, the display color is determined as white.

In a display image 1300 generated from print data in an example illustrated in FIG. 13A, there are a blue area 1310, a brown area 1315, a white area 1320, and a green area 1325 indicating an apple and a radish and the rest of the display image 1300 is an achromatic area 1330.

In an example illustrated in FIG. 13B, a blue area 1350b, a brown area 1355b, a white area 1360b, and a green area 1365b are superimposed upon a white drawing area 1340b of a recording medium (ground). The white area 1360b, therefore, is not distinguished from other areas. That is, since the drawing area 1340b is white, the white area 1360b is invisible.

In an example illustrated in FIG. 13C, a blue area 1350c, a brown area 1355c, a white area 1360c, and a green area 1365c are superimposed upon a black drawing area 1340c of a recording medium (ground). That is, since the drawing area 1340c is black, the white area 1360c is visible.

In an example illustrated in FIG. 13D, a blue area 1350d, a brown area 1355d, a white area 1360d, and a green area 1365d are superimposed upon a red drawing area 1340d of a recording medium (ground). That is, since the drawing area 1340d is red, the white area 1360d is visible.

Figure 14A:
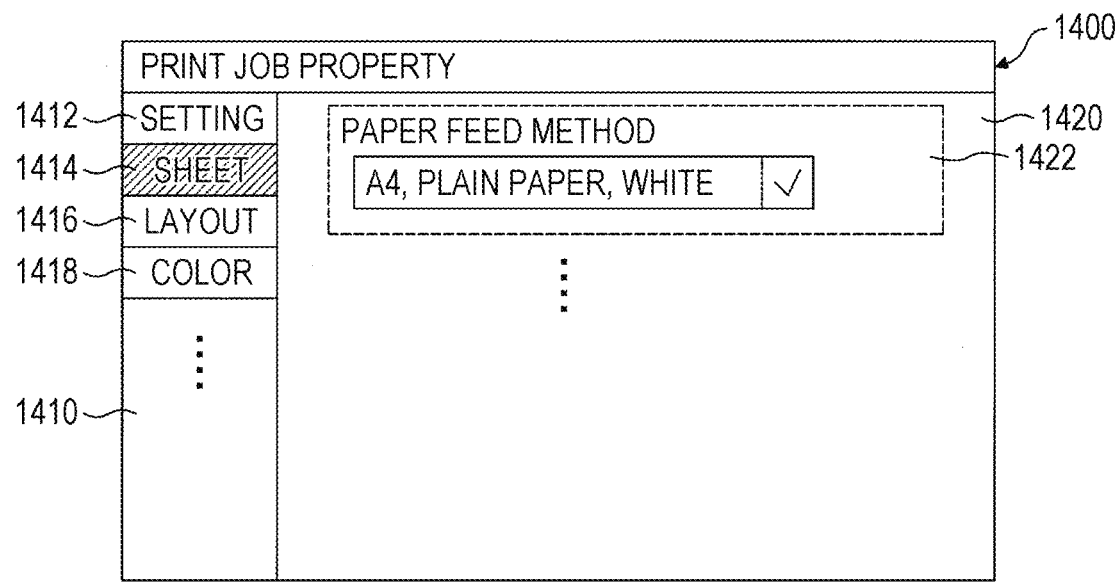
FIGS. 14A and 14B are diagrams illustrating examples of a process according to the first exemplary embodiment.

FIG. 14A illustrates an example of a print job property screen 1400. The print job property screen 1400 indicates details of a print job and includes, for example, a print job property item selection area 1410 and a print job property display area 1420.

The print job property item selection area 1410 includes setting 1412, sheet 1414, layout 1416, and color 1418. If the sheet 1414 is selected, a paper feed method display and change area 1422 and the like are displayed in the print job property display area 1420. In the paper feed method display and change area 1422, a recording medium specified by the print job is displayed. The recording medium may be changed in the paper feed method display and change area 1422 in accordance with a user operation. More specifically, the user operation reception module 115 may receive an operation for changing the recording medium performed by the user operation reception module 115.

Figure 14B:
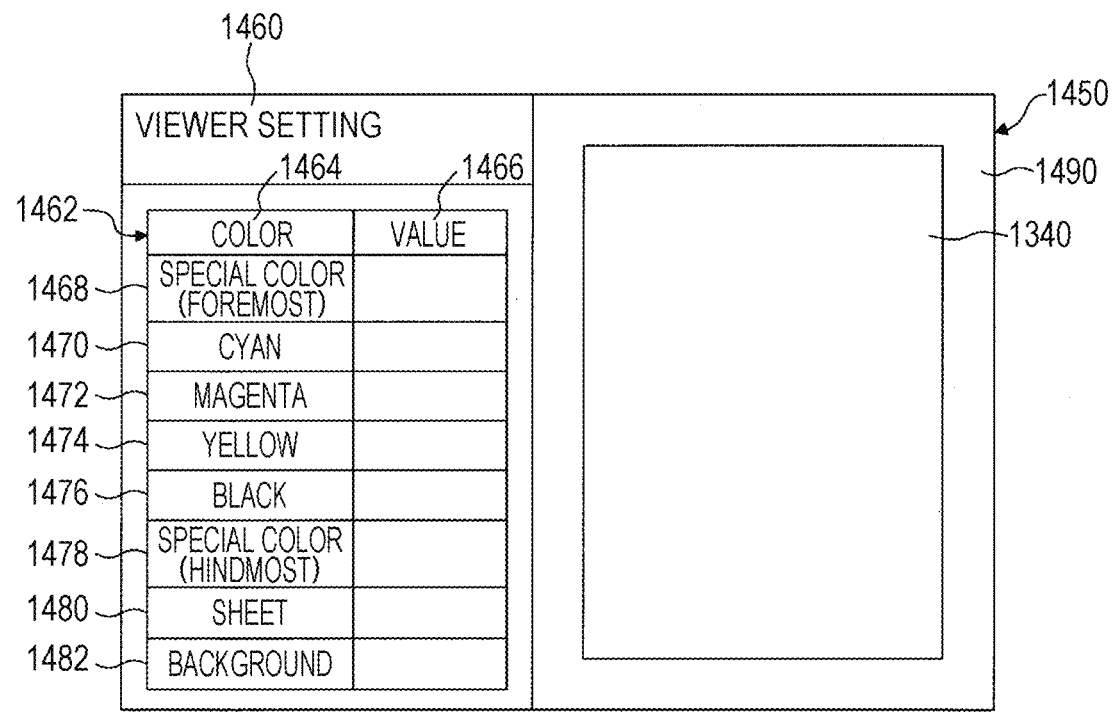

FIG. 14B illustrates an example of a viewer screen 1450. The viewer screen 1450 is used to display a preview image and adjust tones and the like and includes a viewer setting area 1460 and a view area 1490. The viewer setting area 1460 displays a color adjustment table 1462.

The color adjustment table 1462 includes a color field 1464 and a value field 1466 in a column direction and a special color (foremost) field 1468, a cyan field 1470, a magenta field 1472, a yellow field 1474, a black field 1476, a special color (hindmost) field 1478, a sheet field 1480, and a background field 1482. These fields are arranged in order of an actual printing process. That is, the special color (foremost) field 1468 to the special color (hindmost) field 1478 are arranged in order of recording performed by the image forming apparatus 190. In other words, a special color that is a recording color corresponding to the special color (foremost) 1478 is printed directly upon a recording medium, and black, which is a recording color corresponding to the black field 1476, is printed upon the special color. Printing is then performed in a similar manner, and a special color that is a recording color corresponding to the special color (foremost) field 1468 is printed lastly. The order of the fields may be different depending on the image forming apparatus 190 used. It is needless to say that there is a sheet (sheet field 1480) under the color materials, and there is a background under the sheet. The background herein refers to a background of an actual print. For example, when a print is put on a desk, a surface of the desk is the background. When a print includes plural pages, a background of a page is an image printed on a next page, except for a final page. The value field 1466 stores values of colors (e.g., how much each color material is to be used). Tones are adjusted by changing the values in accordance with a user operation.

The viewer area 1490 includes a drawing area 1340. That is, the viewer area 1490 displays a result of a process performed by the preview image display module 110.

FIGS. 15A1 and 15A2 illustrate examples of a preview in an example of the related art (the present exemplary embodiment is not used).

An image is displayed using layers. In the example illustrated in FIG. 15A1, an image preview area (background) 1510a, a medium color image 1520a, and a CMYK image 1540a are superimposed upon one another in this order. The image preview area (background) 1510a is an image of a preview screen itself. In examples illustrated in FIGS. 15A1 to 15C2, an image preview area (background) 1510 (the image preview area (background) 1510a, an image preview area (background) 1510b, or an image preview area (background) 1510c) is a chromatic area. In the examples illustrated in FIGS. 15A1 to 15C2, the image preview area (background) 1510 is black. The image preview area (background) 1510 is an image of the viewer area 1490 other than the drawing area 1340 (an area around the drawing area 1340). The medium color image 1520a is an image of an area corresponding to a recording medium. In the examples illustrated in FIGS. 15A1 and 15A2, the recording medium is white (white sheet). The CMYK image 1540a is a display image generated on the basis of print data. Because a common printer does not include a color material corresponding to a white image (a color material of white, which is a special color), white is expressed by drawing nothing in the white image (the above-mentioned "blank"). The white area 1320, therefore, is not drawn.

FIG. 15A2 illustrates an example of a view area 1590a. That is, the image preview area (background) 1510a, the medium color image 1520a, and the CMYK image 1540a are superimposed in the view area 1590a. Because an upper-left corner of the viewer area 1590a and an upper-left corner of the medium color image 1520a are matched, the image preview area (background) 1510a protrudes from the medium color image 1520a to the right and downward. The white sheet is displayed in a white area 1560a as is. In the preview in the example of the related art, color blending is not performed.

FIGS. 15B1 and 15B2 illustrate examples of a preview that reflects a color of a recording medium (color blending). An image is generated using the above-mentioned "blank".

In the example illustrated in FIG. 15B1, an image preview area (background) 1510b, a medium color image 1520b, and a CMYK image 1540b are superimposed upon one another in this order. The image preview area (background) 1510b is an image of a preview screen itself. The medium color image 1520b is an image of an area corresponding to the recording medium. In the examples illustrated in FIGS. 15B1 and 15B2, the recording medium is red (red sheet). As the CMYK image 1540b, a display image is generated on the basis of print data. The CMYK image 1540b may include four layers of cyan, magenta, yellow, and black. The order of these layers corresponds to the order of recording performed by the image forming apparatus 190. Since a "blank" is used, nothing is drawn in the white area 1320.

FIG. 15B2 illustrates an example of a viewer area 1590b. That is, in the viewer area 1590b, the image preview area (background) 1510b, the medium color image 1520b, and the CMYK image 1540b are superimposed upon one another. Because an upper-left corner of the viewer area 1590b and an upper-left corner of the medium color image 1520b are matched, the image preview area (background) 1510b protrudes from the medium color image 1520b to the right and downward. In a white area 1560b, the red sheet is undesirably displayed as is. Color blending has been performed on a blue area 1550b, a brown area 1555b, and a green area 1565b in order to simulate colors of the image on a print. For this reason, the green area 1565b, for example, is green (reddish green) at a time when the image is directly printed on a red recording medium. Although referred to by the same names in FIGS. 15A2 and 15B2, the blue areas 1550*a* and 1550*b*, the brown areas 1555*a* and 1555*b*, and the green areas 1565*a* and 1565*b* have tones different from each other.

FIGS. 15C1 and 15C2 illustrate examples of a case where a color of a recording medium and the like are reflected (color blending) and a white color material is used for undercoating according to the present exemplary embodiment.

In the example illustrated in FIG. 15C1, an image preview area (background) 1510*c*, a medium color image 1520*c*, a white image 1530*c*, and a CMYK image 1540*c* are superimposed upon one another in this order. The image preview area (background) 1510*c* is an image of a preview screen itself. The medium color image 1520*c* is an image of an area corresponding to the recording medium. In the examples illustrated in FIGS. 15C1 and 15C2, the recording medium is red. The white image 1530*c* is an image of a white part. Here, white is drawn under the blue area 1310, the brown area 1315, the white area 1320, and the green area 1325 as print data (white) 1570*c*. More specifically, the white part of print data included in a print job is drawn. No "blank" is used, but the print data is faithfully drawn. As the CMYK image 1540*c*, a display image is generated on the basis of the print data (cyan, magenta, yellow, and black parts).

FIG. 15C2 illustrates an example of a viewer area 1590*c*. That is, in the viewer area 1590*c*, the image preview area (background) 1510*c*, the medium color image 1520*c*, the white image 1530*c*, and the CMYK image 1540*c* are superimposed upon one another. Because an upper-left corner of the viewer area 1590*c* and an upper-left corner of the medium color image 1520*c* are matched, the image preview area (background) 1510*c* protrudes from the medium color image 1520*c* to the right and downward. In a white area 1560*c*, the white image 1530*c* is used. Color blending has been performed on a blue area 1550*c*, a brown area 1555*c*, the white area 1560*c*, and a green area 1565*c* in order to simulate colors of the image on a print. These areas, however, are undercoated by the white image 1530*c*. The green area 1565*c*, for example, is simulated by printing white on the red recording medium and then printing green on the white. As a result, the red recording medium hardly, if at all, affects the green area 1325, and green in the green area 1325 is faithfully simulated.

Next, a case where a recording medium is transparent (e.g., an overhead projector (OHP) film) will be described with reference to examples illustrated in FIGS. 16A1 to 16C2.

FIG. 16A1 illustrates a preview in an example of the related art (the present exemplary embodiment is not used).

In the example illustrated in FIG. 16A1, an image preview area (background) 1610*a*, a medium color image 1620*a*, and a CMYK image 1640*a* are superimposed upon one another in this order. The image preview area (background) 1610*a* is an image of a preview screen itself. In the example illustrated in FIG. 16A1, the image preview area (background) 1610*a* is black. The image preview area (background) 1610*a* is, for example, an image of the viewer area 1490 illustrated in FIG. 14B other than the drawing area 1340 (the area around the drawing area 1340). The medium color image 1620*a* is an image of an area corresponding to the recording medium. In the example illustrated in FIG. 16A1, the recording medium is transparent. As the CMYK image 1640*a*, a display image is generated on the basis of print data. Because a common printer does not include a color material corresponding to a white image, white is expressed by drawing nothing in the white image (the above-mentioned "blank"). The white area 1320, therefore, is not drawn.

Because it is difficult to directly express the transparency of the recording medium, a color of the recording medium (medium color image 1620) is set to the same color as a background color (image preview area (background) 1610) to make the recording medium look transparent. More specifically, as in the example illustrated in FIG. 16B1, an image preview area 1610*b*, a medium color image 1620*b*, and a CMYK image 1640*b* are superimposed upon one another in this order. A color of the medium color image 1620*b* is the same as that of the image preview area (background) 1610*b* (image preview area (background) 1610*a*).

As a result, as in the example illustrated in FIG. 16B2, a viewer area 1690*b* is displayed. That is, in the view area 1690*b*, the image preview area (background) 1610*b*, the medium color image 1620*b*, and the CMYK image 1640*b* are superimposed upon another. Because an upper-left corner of the viewer area 1690*b* and an upper-left corner of the medium color image 1620*b* are matched, the image preview area (background) 1610*b* protrudes from the medium color image 1620*b* to the right and downward. Although the transparency of the recording medium can be expressed, the image preview area (background) 1610*b* (medium color image 1620*b*) is undesirably displayed in a white area 1660*b* as is. Color blending has been performed on a blue area 1650*b*, a brown area 1655*b*, and a green area 1665*b* in order to simulate colors of the image on a print. For this reason, the green area 1565*b*, for example, is green (blackish green) at a time when the image is printed on a black background.

FIGS. 16C1 and 16C2 illustrate examples of a case where a recording medium is transparent, a color of a background and the like are reflected (color blending), and a white color material is used for undercoating according to the present exemplary embodiment.

In the example illustrated in FIG. 16C1, an image preview area (background) 1610*c*, a medium color image 1620*c*, a white image 1630*c*, and a CMYK image 1640*c* are superimposed upon one another in this order. The image preview area (background) 1610*c* is an image of a preview screen itself. The medium color image 1620*c* is an image of an area corresponding to the recording medium. In the examples illustrated in FIGS. 16C1 and 16C2, the recording medium is transparent. A color of the medium color image 1620*c* is the same as that of the image preview area (background) 1610*c*. The white image 1630*c* is an image of a white part. Here, white is drawn under the blue area 1310, the brown area 1315, the white area 1320, and the green area 1325 as print data (white) 1670*c*. More specifically, the white part of print data included in a print job is drawn. No "blank" is used, but the print data is faithfully drawn. As the CMYK image 1640*c*, a display image is generated on the basis of the print data (cyan, magenta, yellow, and black parts).

FIG. 16C2 illustrates an example of a viewer area 1690*c*. That is, in the viewer area 1690*c*, the image preview area (background) 1610*c*, the medium color image 1620*c*, the white image 1630*c*, and the CMYK image 1640*c* are superimposed upon one another. Because an upper-left corner of the viewer area 1690*c* and an upper-left corner of the medium color image 1620*c* are matched, the image preview area (background) 1610*c* protrudes from the medium color image 1620*c* to the right and downward. In a white area 1660*c*, the white image 1630*c* is used. Color blending has been performed on a blue area 1650*c*, a brown area 1655*c*, the white area 1660*c*, and a green area 1665*c* in order to simulate colors of the image on a print disposed upon a black background. These areas, however, are undercoated by the white image 1630c. The green area 1665c, for example, is simulated by printing white on the transparent recording medium, printing green on the white, and then disposing the print on black. As a result, the black background hardly, if at all, affects the green area 1325, and green in the green area 1325 is faithfully simulated.

A method for causing an image to reflect a color of a recording medium (or a background color) (a blending method or simulation) will be described with reference to examples illustrated in FIGS. 17 and 18.

FIG. 17 illustrates an example of a case where there is no white image between a recording medium and a printed image (CMYK data subjected to red, green, and blue (RGB) conversion for a preview). More specifically, a viewer area image 1730 is generated by performing alpha blending 1750 on a medium color image 1720 and a printed image 1710 in units of pixels with a luminance of the printed image 1710 set as an alpha value. In the viewer area image 1730, therefore, a color of the medium color image 1720 affects objects (the apple and the radish) in the printed image 1710.

Figure 18:
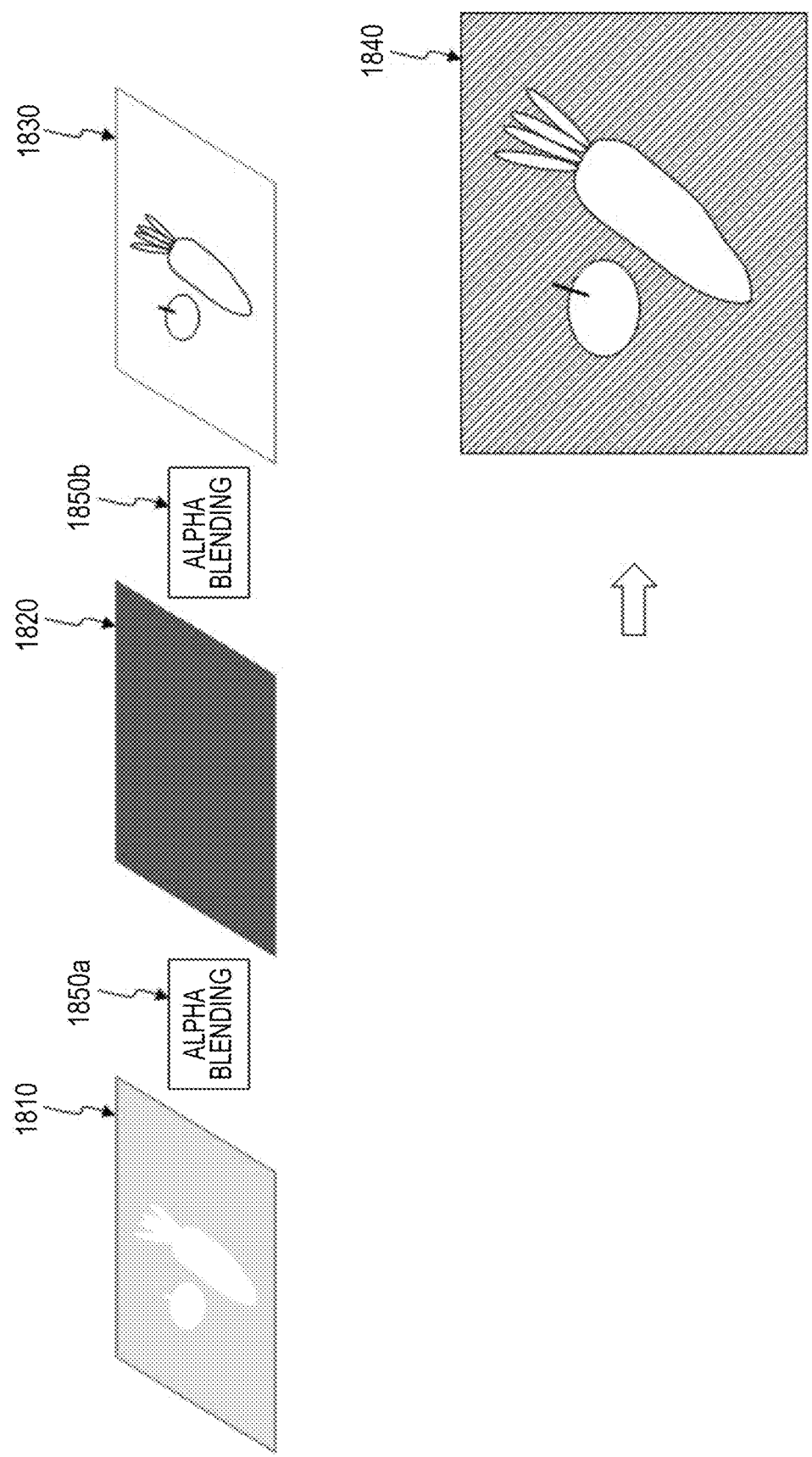
FIG. 18 is a diagram illustrating another example of the blending.

FIG. 18 illustrates an example of a case where there is a white image between a recording medium and a printed image (CMYK data subjected to RGB conversion for a preview). More specifically, a viewer area image 1840 is generated by (1) performing alpha blending 1850a on a medium color image 1820 and a white image 1810 in units of pixels with a density of the white image 1810 as an alpha value and (2) performing alpha blending 1850b on a result of (1) and the printed image 1830 in units of pixels with a luminance of the printed image 1830 set as an alpha value.

A luminance Y, for example, is calculated using the following expression (a weighted average of RGB values).

Luminance $Y=0.299 \times R+0.587 \times G+0.114 \times B$

If the luminance Y is 255, the alpha value may be 1.0 (opaque), and if the luminance Y is 0, the alpha value may be 0.0 (fully transparent).

Second Exemplary Embodiment

Figure 19:
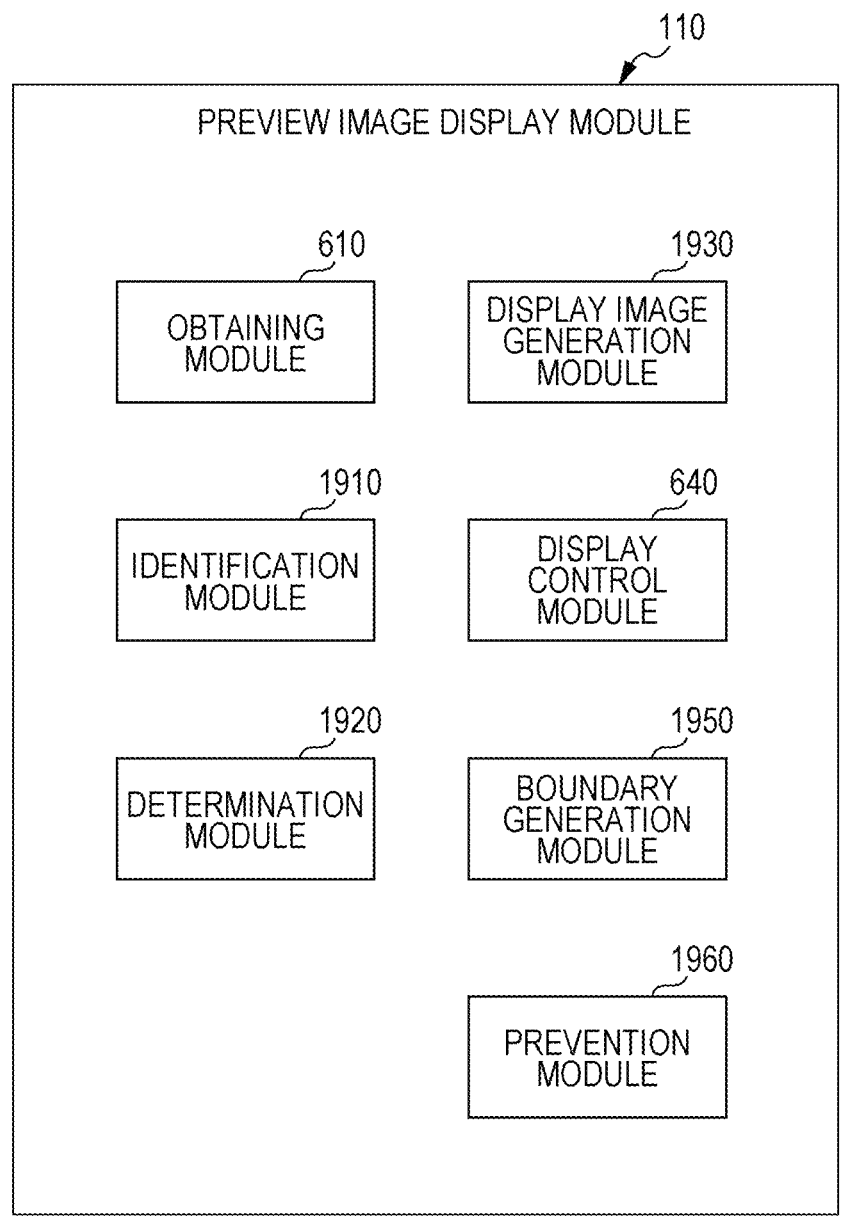
FIG. 19 is a conceptual diagram illustrating an example of the configuration of modules according to a second exemplary embodiment.

FIG. 19 is a conceptual diagram illustrating an example of the configuration of modules according to the second exemplary embodiment. In the second exemplary embodiment, an effect of a color of a recording medium upon a printed image is indicated by a preview image by performing blending.

The preview image display module 110 includes the obtaining module 610, an identification module 1910, a determination module 1920, a display image generation module 1930, the display control module 640, a boundary generation module 1950, and a prevention module 1960. The same components as those according to the above exemplary embodiment are given the same reference numerals, and redundant description thereof is omitted. The same holds for the following exemplary embodiments.

The obtaining module 610 obtains attribute information that specifies a process performed by the image forming apparatus 190 in accordance with a print job including print data. The obtaining module 610 may obtain the attribute information from the specified color materials field 480 or the recording medium field 490 of the print job table 400.

The identification module 1910 identifies a color of a recording medium specified by attribute information obtained by the obtaining module 610.

The identification module 1910 may also identify a color of a recording medium available in the image forming apparatus 190. Here, the identification module 1910 may obtain the color of the recording medium available in the image forming apparatus 190 from the image forming apparatus 190. More specifically, the identification module 1910 may communicate with the image forming apparatus 190 to identify a color of a recording medium stored in the image forming apparatus 190. When a color of a recording medium is set for each paper feed unit storing the recording medium, the image forming apparatus 190 may detect the color of the recording medium depending on which paper feed unit is available or detect the color of the recording medium using a color sensor or the like.

The determination module 1920 determines, as a color of a recording medium identified by the identification module 1910, a display color of a drawing area which corresponds to an area of a recording medium for printing print data and in which a display image generated by the display image generation module 1930 is to be disposed.

The display image generation module 1930 generates a display image on the basis of a color of a recording medium identified by the identification module 1910 and print data included in a print job.

When the display image generation module 1930 generates a display image on the basis of a color of a recording medium and print data included in a print job, the color of the recording medium and a color specified by the print data are combined with each other. That is, a color of a display image drawn on a recording medium on the basis of print data viewed by a human eye is generated. This is equivalent to the simulation in the first exemplary embodiment. More specifically, although a color obtained by applying yellow toner onto a white sheet (substantially a color of the yellow toner) and a color obtained by applying yellow toner onto a red sheet (yellow affected by the red in a ground) are different from each other, blending is performed such that these colors are obtained. A blending method is specifically a known method such as alpha blending.

The image forming apparatus 190 may or may not include a recording unit capable of recording a special color such as white.

When a color of a recording medium identified by the identification module 1910 is not transparent, the display image generation module 1930 may generate a display image on the basis of the color of the recording medium and print data. When a recording medium is transparent, a color of the recording medium does not affect a color applied on the basis of print data. The color of the recording medium, therefore, need not be used when a display image is generated.

The display image generation module 1930 may generate a display image in predetermined order. The predetermined order may be, for example, the order of colors recorded by the image forming apparatus 190.

When a color recorded directly upon a recording medium is white, the display image generation module 1930 may generate a display image on the basis of print data regardless of a color of the recording medium. That is, the color of the recording medium is not used when the display image is generated. The color recorded directly upon the recording medium refers to a first color recorded by the image forming apparatus 190. Other colors are therefore applied upon the first color. When a color recorded directly upon a recording medium is white, a color of the recording medium does not affect colors applied upon the white (i.e., the color of the recording medium is hidden behind the white). The color of the recording medium, therefore, need not be used, and a display image may be generated only on the basis of print data.

The display image generation module 1930 may generate a first image including basic recording colors of the image forming apparatus 190 and a second image including a special color different from the basis recording colors. The display image generation module 1930 may then sequentially blend the first and second images with a color of a recording medium in predetermined order to generate a display image. The basic recording colors and the special color different from the basic recording colors are as described above. The first image corresponds, for example, to the CMYK image 1540c illustrated in FIG. 15C1, and the second image corresponds to the white image 1530c illustrated in FIG. 15C1.

The display control module 640 controls the display module 120 such that the display device 210 displays a display image generated by the display image generation module 1930.

The boundary generation module 1950 generates a boundary between a recording medium and a white image part on the white image part recorded on the recording medium. More specifically, because it is difficult to tell a white image part even after the display device 210 draws the white image part on a white recording medium, a boundary is drawn so that the white image part can be identified.

The prevention module 1960 prevents the display image generation module 1930 from generating a display image using a color of a recording medium. More specifically, blending such as alpha blending is not performed. Only a process for generating a display image already performed generally, therefore, may be performed. Since blending is not performed, a display image can be generated more promptly (the display image can be displayed earlier).

Alternatively, the prevention module 1960 may prevent the display image generation module 1930 from performing blending using a first image, a second image, and a color of a recording medium. Targets of blending are a first image, a second image, and a color of a recording medium. The limiting module 1960 does not permit such blending.

Figure 20:
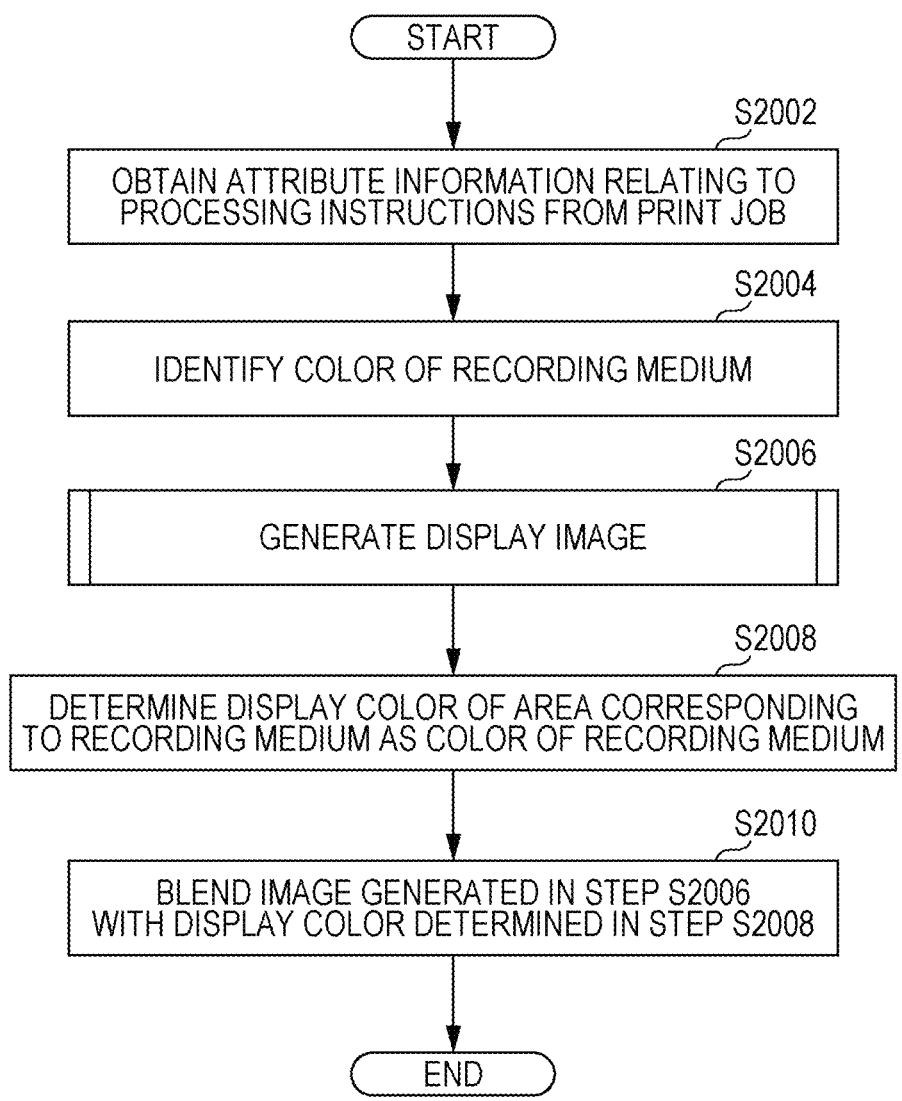
FIG. 20 is a flowchart illustrating an example of a process according to the second exemplary embodiment.

FIG. 20 is a flowchart illustrating an example of a process according to the second exemplary embodiment.

In step S2002, the obtaining module 610 obtains attribute information relating to processing instructions from a print job. For example, the obtaining module 610 may obtain the attribute information from the specified color materials field 480 or the recording medium field 490 of the print job table 400.

In step S2004, the identification module 1910 identifies a color of a recording medium.

In step S2006, the display image generation module 1930 generates a display image. Details of step S2006 will be described later with reference to flowcharts of FIGS. 21 to 24. One of processes illustrated in FIGS. 21 to 24 may be performed, or a combination of some of these processes may be performed.

In step S2008, the determination module 1920 determines a display color of an area corresponding to the recording medium as the color of the recording medium. The area corresponding to the recording medium corresponds to an achromatic part.

In step S2010, the display control module 640 blends the image generated in step S2006 with the display color determined in step S2008.

Figure 21:
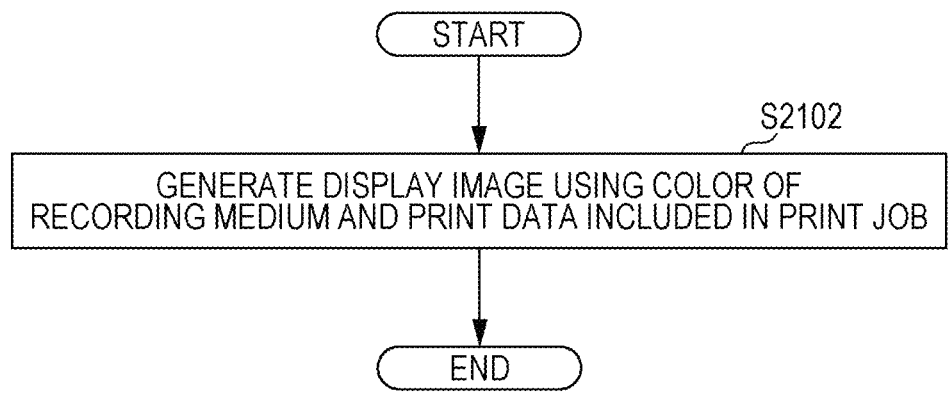
FIG. 21 is a flowchart illustrating an example of a process according to the second exemplary embodiment.

FIG. 21 is a flowchart illustrating an example of a process (an example of step S2006) according to the second exemplary embodiment.

In step S2102, a display image is generated using the color of the recording medium and the print data included in the print job. For example, a first image including the basic recording colors of the image forming apparatus 190 and a second image including a special color are generated. The first and second images may be sequentially blended with the color of the recording medium in predetermined order (e.g., the order of colors recorded by the image forming apparatus 190). A display image is obtained as a result of the blending.

Figure 22:
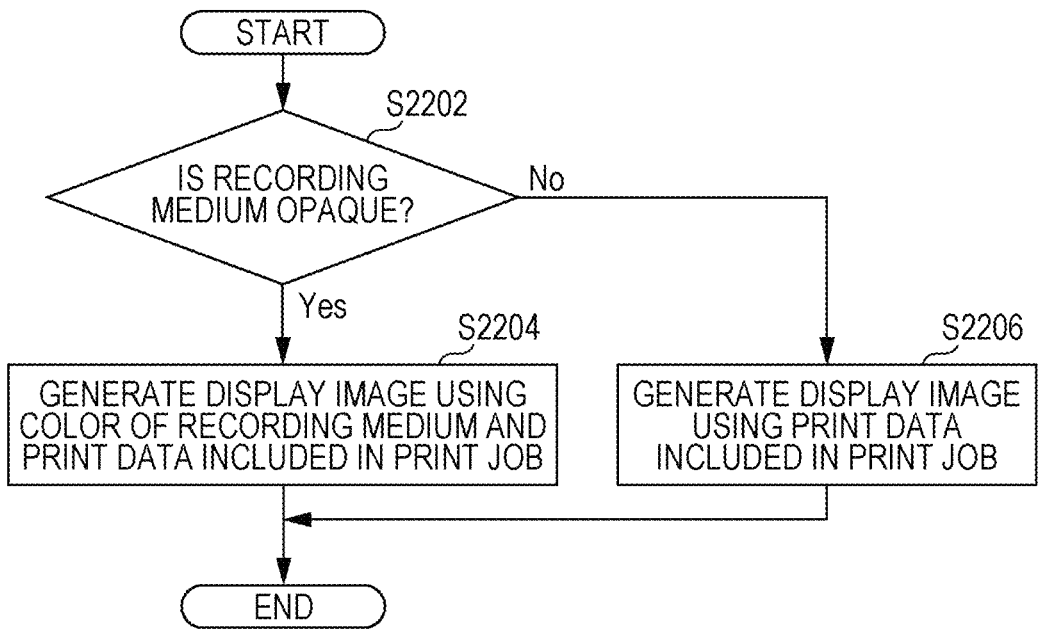
FIG. 22 is a flowchart illustrating another example of the process according to the second exemplary embodiment.

FIG. 22 is a flowchart illustrating another example of the process (an example of step S2006) according to the second exemplary embodiment.

In step S2202, whether the recording medium is opaque is determined. If so, the process proceeds to step S2204, and if not (if the recording medium is not opaque), the process proceeds to step S2206.

In step S2204, a display image is generated using the color of the recording medium and the print data included in the print job. Color blending may also be performed.

In step S2206, a display image is generated using the print data included in the print job.

Figure 23:
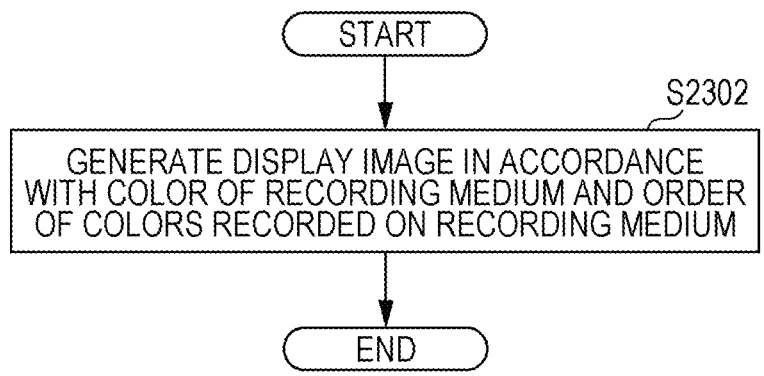
FIG. 23 is a flowchart illustrating another example of the process according to the second exemplary embodiment.

FIG. 23 is a flowchart illustrating another example of the process (an example of step S2006) according to the second exemplary embodiment.

In step S2302, a display image is generated in accordance with the color of the recording medium and the order of colors recorded on the recording medium. More specifically, color blending is performed in accordance with the color of the recording medium and then the order of the color materials recorded by the image forming apparatus 190.

Figure 24:
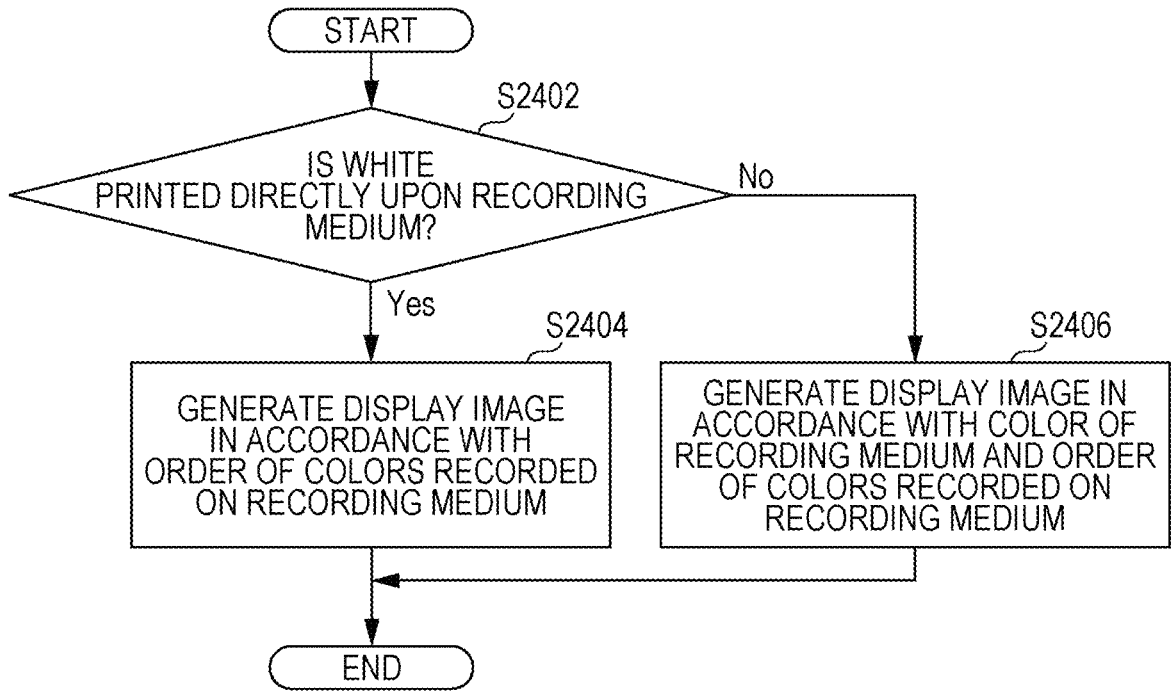
FIG. 24 is a flowchart illustrating another example of the process according to the second exemplary embodiment.

FIG. 24 is a flowchart illustrating another example of the process (an example of step S2006) according to the second exemplary embodiment.

In step S2402, whether white is printed directly upon the recording medium is determined. If so, the process proceeds to step S2404, and if not, the process proceeds to step S2406.

In step S2404, a display image is generated in accordance with the order of colors recorded on the recording medium. That is, a display image is generated without taking into consideration the color of the recording medium.

In step S2406, a display image is generated in accordance with the color of the recording medium and the order of colors recorded on the recording medium. More specifically, color blending is performed in accordance with the color of the recording medium and then the order of the color materials recorded by the image forming apparatus 190.

Figure 25:
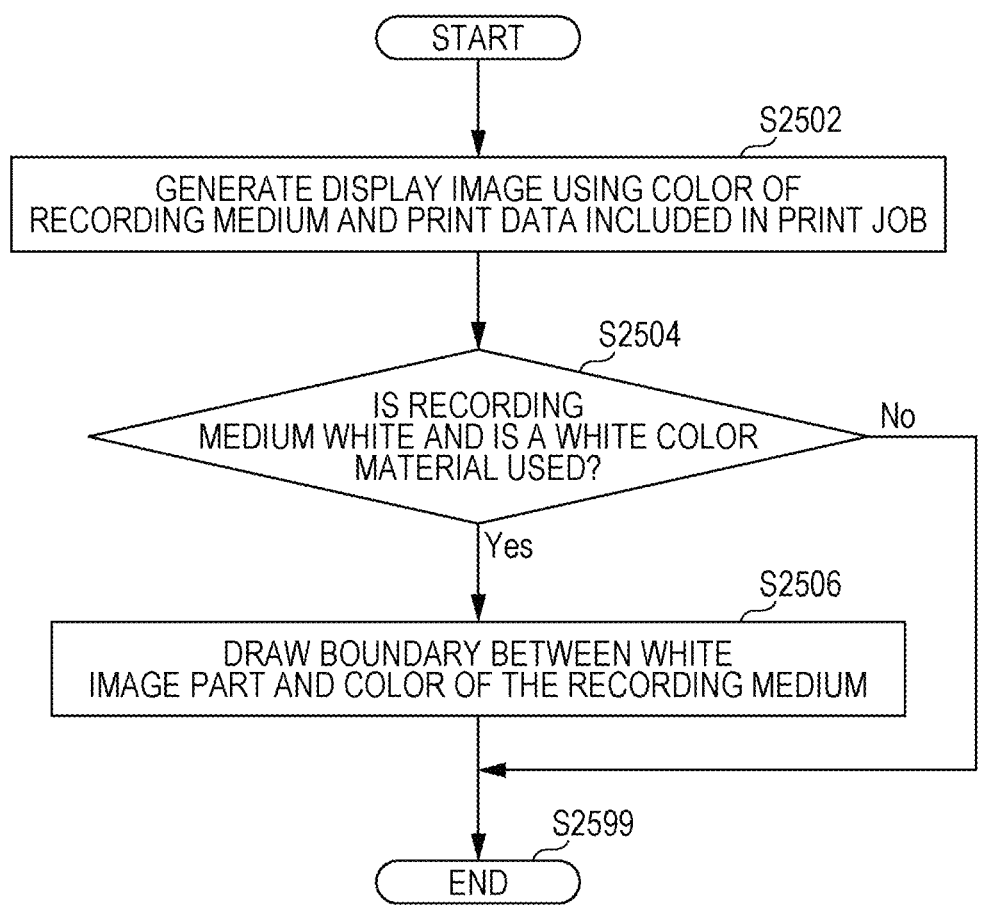
FIG. 25 is a flowchart illustrating an example of a process according to the second exemplary embodiment.

In the process for generating a display image, a boundary may be drawn as in an example illustrated in FIG. 25.

FIG. 25 is a flowchart illustrating an example of a process according to the second exemplary embodiment.

In step S2502, a display image is generated using the color of the recording medium and the print data included in the print job. When the display image is generated, the process illustrated in FIG. 26 or 27 may also be performed.

In step S2504, whether the recording medium is white and whether a white color material is used is determined. If so, the process proceeds to step S2506, and if not, the process ends (step S2599).

In step S2506, a boundary is drawn between a white image part and the color of the recording medium, which is white.

Figure 26:
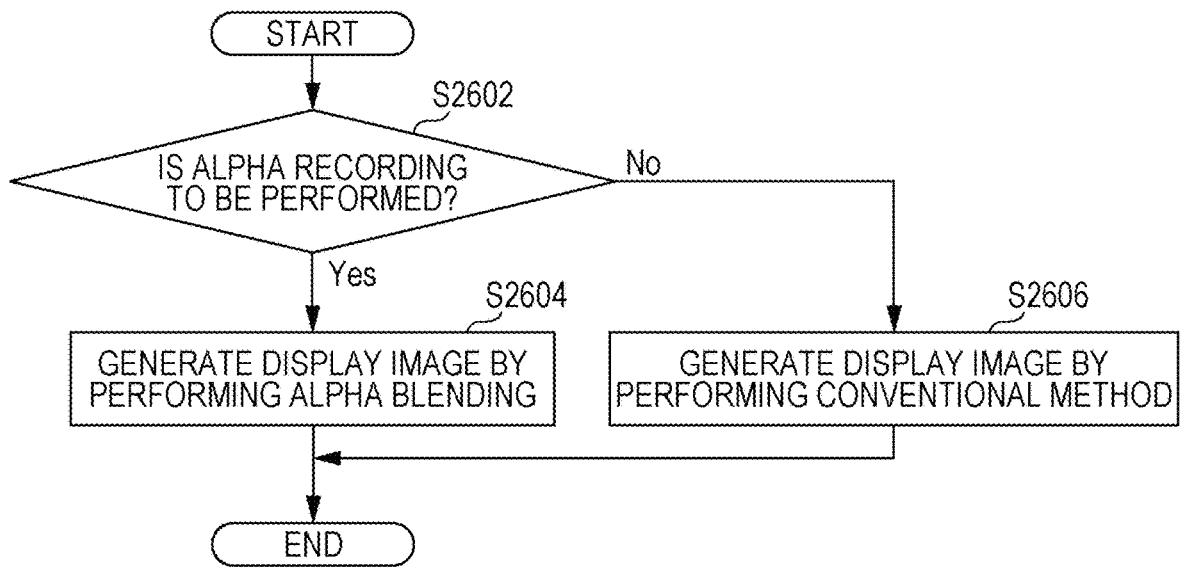
FIG. 26 is a flowchart illustrating an example of a process according to the second exemplary embodiment.
Figure 27:
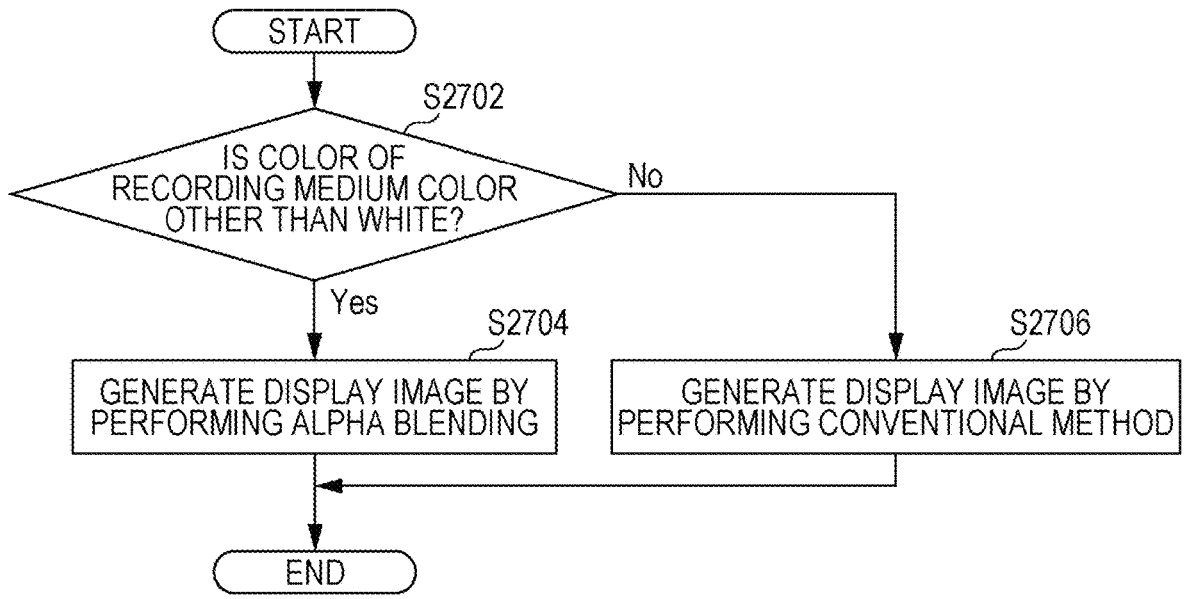
FIG. 27 is a flowchart illustrating an example of a process according to the second exemplary embodiment.

In the process for generating a display image, the blending may be prevented (inhibited) as in examples illustrated in FIGS. 26 and 27.

FIG. 26 is a flowchart illustrating an example of a process according to the second exemplary embodiment.

In step S2602, the prevention module 1960 receives a user operation and determines whether to perform alpha blending. If so, the process proceeds to step S2604, and if not, the process proceeds to step S2606. The user operation may be, for example, an operation for determining whether to display an image equivalent to a print (whether to perform alpha blending). When an image equivalent to a print is to be displayed, the user may be notified that it will take longer to display the image.

In step S2604, the display image generation module 1930 generates a display image by performing alpha blending.

In step S2606, the display image generation module 1930 generates a display image by performing a conventional method.

FIG. 27 is a flowchart illustrating an example of a process according to the second exemplary embodiment.

In step S2702, the prevention module 1960 determines whether the color of the recording medium is a color other than white. If so, the process proceeds to step S2704, and if not (if the recording medium is white), the process proceeds to step S2706.

In step S2704, the display image generation module 1930 generates a display image by performing alpha blending.

In step S2706, the display image generation module 1930 generates a display image by performing a conventional method. This is because when the recording medium is white, there would be little difference from a result obtained using the conventional method, in which blending is not performed, even if white blending was performed. The conventional method, therefore, is performed in order to reduce display time.

Figure 28A:
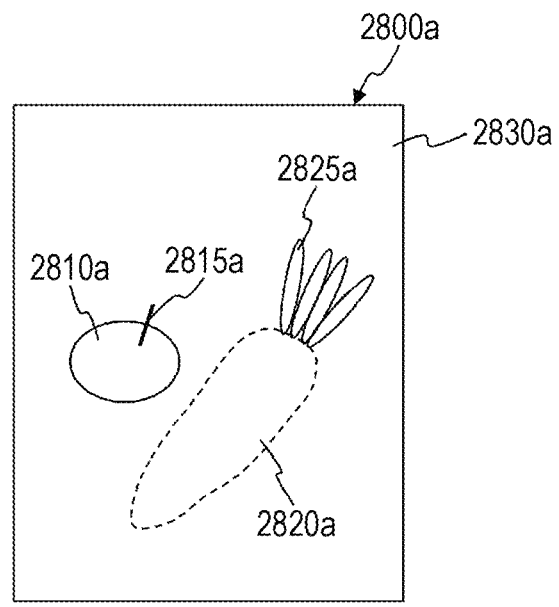
FIGS. 28A to 28C are diagrams illustrating examples of a process according to the second exemplary embodiment.
Figure 28B:
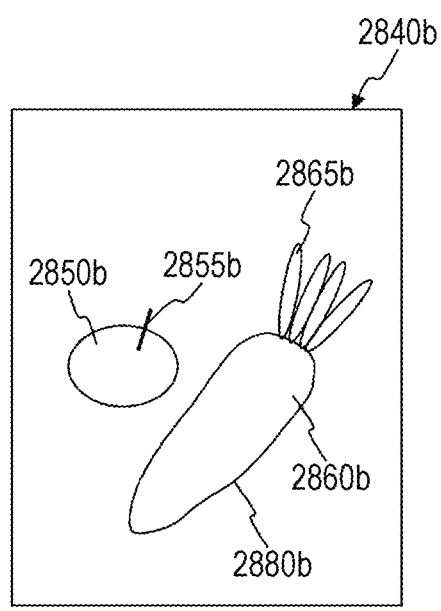
Figure 28C:
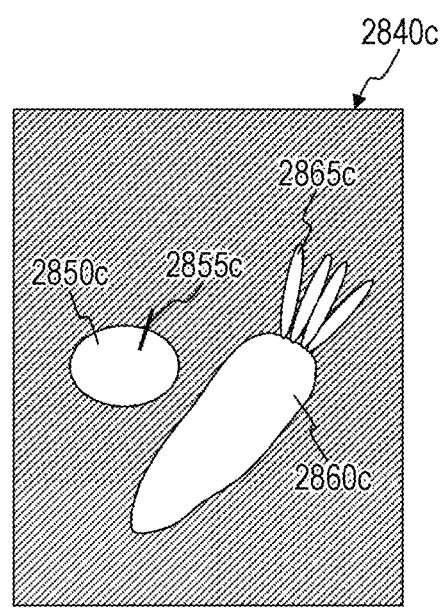

FIGS. 28A to 28C are diagrams illustrating examples of a process according to the second exemplary embodiment.

In a display image 2800a generated from print data in the example illustrated in FIG. 28, there are a blue area 2810a, a brown area 2815a, a white area 2820a (a contour is indicated by a broken line), and a green area 2825a indicating an apple and a radish and the rest of the display image 2800a is an achromatic area 2830a.

In the example illustrated in FIG. 28B, the process illustrated in the flowchart of FIG. 25 has been performed. Because a recording medium is white, a boundary is drawn.

The example illustrated in FIG. 28C illustrates a case where the user has determined in the flowchart of FIG. 26 that alpha blending is not to be performed. Alpha blending is not performed even through a recording medium is black. A white area 2860c and the like, therefore, are not affected by the black recording medium.

Third Exemplary Embodiment

FIG. 29 is a conceptual diagram illustrating an example of the configuration of modules according to the third exemplary embodiment. In the third exemplary embodiment, for example, a preview image that takes into consideration a color of a recording medium is generated.

The preview image display module 110 includes the obtaining module 610, an identification module 2910, a setting module 2920, a display image generation module 2930, a display control module 2940, a boundary image generation module 2950, and a prevention module 2960.

The obtaining module 610 obtains attribute information that specifies a process performed by the image forming apparatus 190 in accordance with a print job including print data.

The identification module 2910 identifies a color of a recording medium specified by attribute information that specifies a process performed by the image forming apparatus 190 in accordance with a print job.

Figure 35:
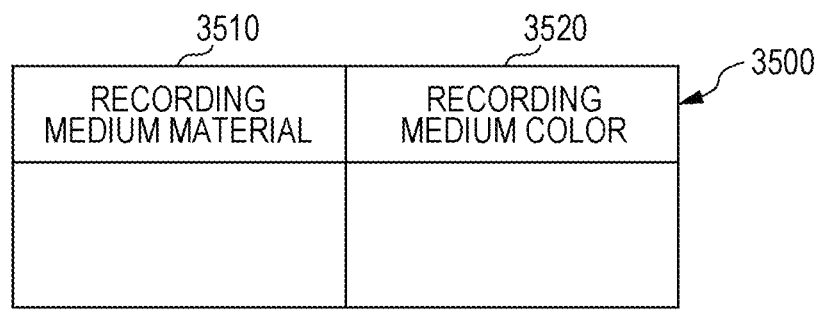
FIG. 35 is a diagram illustrating an example of the data structure of a recording medium table.

The identification module 2910 may also identify a color of a recording medium usable in the image forming apparatus 190. The color of the recording medium may be associated with a material of the recording medium. For example, the color of the recording medium and the material of the recording medium may be associated with each other using a recording medium table 3500. FIG. 35 is a diagram illustrating an example of the data structure of the recording medium table 3500. The recording medium table 3500 includes a recording medium material field 3510 and a recording medium color field 3520. The recording medium material field 3510 stores a material of a recording medium. The recording medium color field 3520 stores a color of the recording medium associated with the material of the recording medium. When the recording medium is plain paper, for example, the recording medium is white. When the recording medium is film, the recording medium is transparent.

The setting module 2920 sets a background image of a recording medium. The setting module 2920 may set the background image, for example, in the background field 1482 of the viewer setting area 1460 illustrated in FIG. 14B in accordance with a user operation.

The display image generation module 2930 generates a display image using (1) a color of a recording medium identified by the identification module 2910, (2) a background image set by the setting module 2920, and (3) print data. Blending of these three images (colors) may be performed.

When the color of the recording medium identified by the identification module 2910 is not transparent, the display image generation module 2930 may generate a display image on the basis of the color of the recording medium and the print data. The term "transparent" may refer not only to a fully transparent state but also to a translucent state, in which a background can be seen through a recording medium.

When the color of the recording medium identified by the identification module 2910 is transparent, the display image generation module 2930 may generate a display image on the basis of the background image set by the identification module 2910 and the print data.

Alternatively, the display image generation module 2930 may generate a display image in predetermined order. The predetermined order may be, for example, the order of colors recorded by the image forming apparatus 190.

When a color recorded directly upon the recording medium is white, the display image generation module 2930 may generate a display image on the basis of the print data regardless of the color of the recording medium. The color recorded directly upon the recording medium refers to a first color recorded by the image forming apparatus 190. Other colors are therefore applied upon the first color. When a color recorded directly upon a recording medium is white, a color of the recording medium does not affect colors applied upon the white (i.e., the color of the recording medium is hidden behind the white). The color of the recording medium, therefore, need not be used, and a display image may be generated only on the basis of print data.

The display control module 2940 displays, on a display unit (the display device 210 etc.), (1) a first area, in which a display image generated from print data included in a print job performed by the image forming apparatus 190 is disposed, (2) a second area, which corresponds to a recording medium on which an image corresponding to the display image is to be recorded and in which the display image is to be disposed in the second area, and (3) a third area, which corresponds to a background of the recording medium and includes the second area.

Here, the first area is an area including an image drawn on the basis of print data and, more specifically, is a part, after printing, corresponding to a part colored by the image forming apparatus 190 (colored with toners of the basic recording colors (YMCK) and a special color (white, silver, gold, etc.)). The first area will also be referred to as a "chromatic part" hereinafter. In the example illustrated in FIG. 15C1, the first area corresponds to the white image 1530c and the CMYK image 1540c.

The second area is an area corresponding to a recording medium (ground) on the display unit and an area in which a display image is drawn. In the example illustrated in FIG. 15C1, the second area corresponds to the medium color image 1520c.

The third area is an area corresponding, after printing is performed on a recording medium, to an area of a background of the recording medium. The third area is an area in which a preview image is displayed on the display unit, that is, the background of the recording medium and a surrounding area (the surrounding area is optional). The third area is generally larger than the second area. The third area corresponds to, for example, a surface of a desk on which a recording medium is put, an object such as, when the recording medium is wrapping paper, a product wrapped in the wrapping paper, or a screen or a wall used for screening when the recording medium is film used on an OHP. In the example illustrated in FIG. 15C1, the third area corresponds to the image preview area (background) 1510c.

When the recording medium is transparent, the display control module 2940 may display an image including a background image in the second area other than the first area.

The display control module 2940 may edit a background image before displaying the background image. As described above, the display control module 2940 might, for example, change the background image to a surface of a desk, an object such as a product, a screen, a wall, or the like. The display control module 2940 might, for example, perform editing on a preset background image, such as adjustment of brightness or tones, in order to make a background look transparent through a recording medium such as a transparent film.

The background image may be a uniform chromatic image. The background image may be, for example, black, brown, red, or the like.

The boundary image generation module 2950 may also display an image indicating a boundary between the second area and the third area. The image may be, for example, a straight line or an image indicating the thickness of paper in three dimensions.

The boundary image generation module 2950 may allow the user to select that the image indicating the boundary is to be displayed. For this purpose, a button for displaying the image indicating the boundary (or a button for not displaying the image indicating the boundary), for example, may be displayed as a user interface, or whether to display the image indicating the boundary may be set as a display environment setting.

The prevention module 2960 prevents the display image generation module 2930 from generating a display image using a color of a recording medium and a background image. More specifically, blending such as alpha blending is not performed. Only a process for generating a display image already performed generally, therefore, may be performed. Since blending is not performed, a display image can be generated more promptly (the display image can be displayed earlier).

Alternatively, the prevention module 2960 may prevent the display image generation module 2930 from performing blending using an image based on print data, an image including a color of a recording medium, and a background image. Targets of blending are colors of a first area, a second area, and a third area. The prevention module 2960 does not permit such blending.

Figure 30:
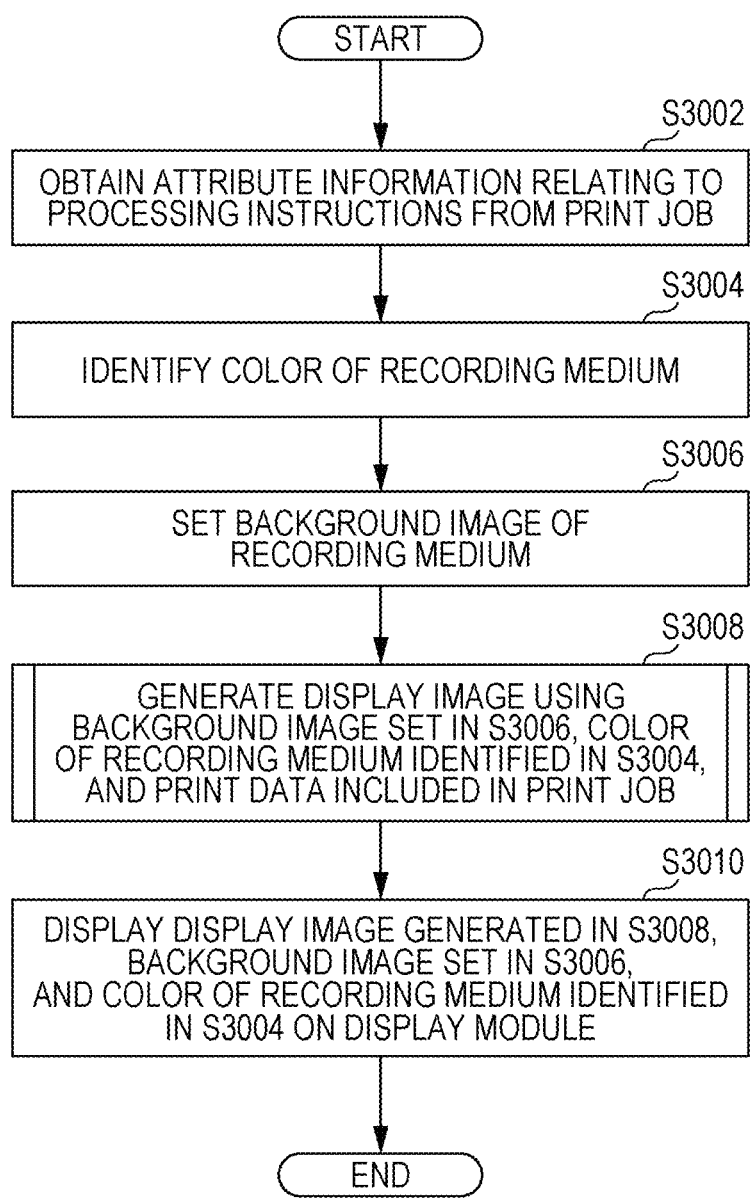
FIG. 30 is a flowchart illustrating an example of a process according to the third exemplary embodiment.

FIG. 30 is a flowchart illustrating an example of a process according to the third exemplary embodiment.

In step S3002, the obtaining module 610 obtains attribute information relating to processing instructions from a print job. For example, the obtaining module 610 may obtain the attribute information from the specified color materials field 480 or the recording medium field 490 of the print job table 400.

In step S3004, the identification module 2910 identifies a color of a recording medium.

In step S3006, the setting module 2920 sets a background image of the recording medium.

In step S3008, the display image generation module 2930 generates a display image using the background image set in step S3006, the color of the recording medium identified in step S3004, and print data included in the print job. Details of step S3008 will be described later with reference to flowcharts of FIGS. 31 to 33. One of processes illustrated in FIGS. 31 to 33 may be performed, or a combination of some of these processes may be performed.

In step S3010, the display control module 2940 displays, on the display module 120, the display image generated in step S3008, the background image set in step S3006, and the color of the recording medium identified in step S3004. Step S3010 may be replaced by a process illustrated in FIG. 34.

Figure 31:
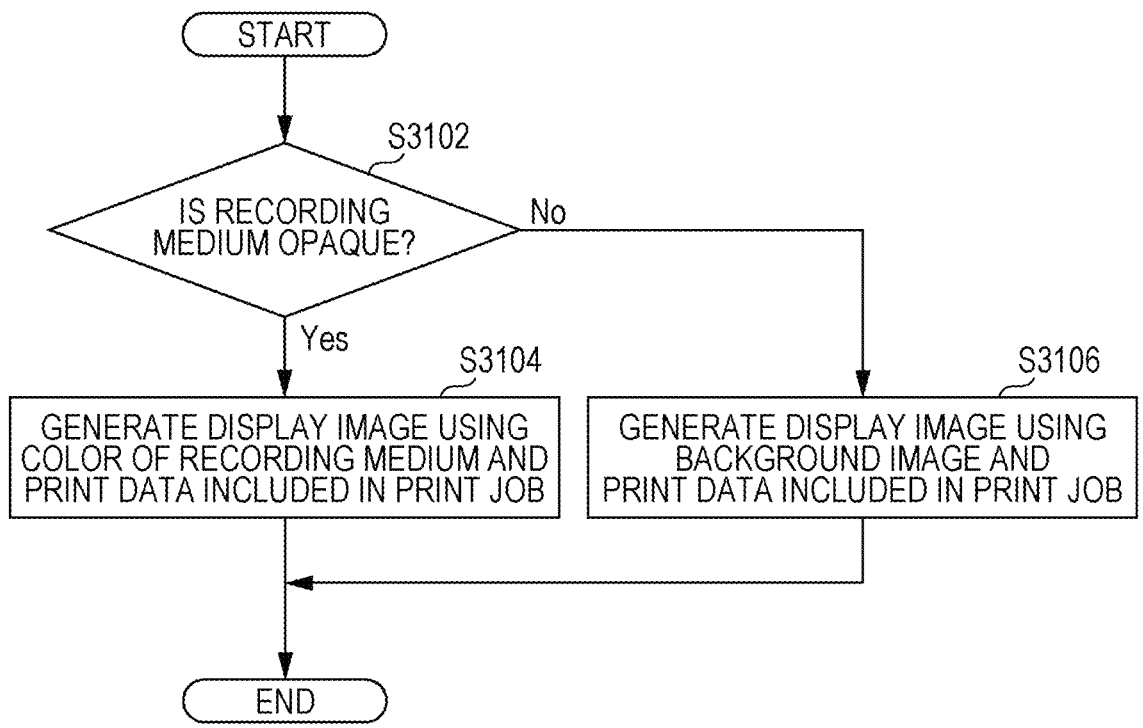
FIG. 31 is a flowchart illustrating an example of a process according to the third exemplary embodiment.

FIG. 31 is a flowchart illustrating an example of a process (an example of step S3008) according to the third exemplary embodiment. A type of blending becomes different depending on whether the recording medium is transparent.

In step S3102, whether the recording medium is opaque is determined. If so, the process proceeds to step S3104, and if not, the process proceeds to step S3106.

In step S3104, a display image is generated using the color of the recording medium and the print data included in the print job.

In step S3106, a display image is generated using the background image and the print data included in the print job.

Figure 32:
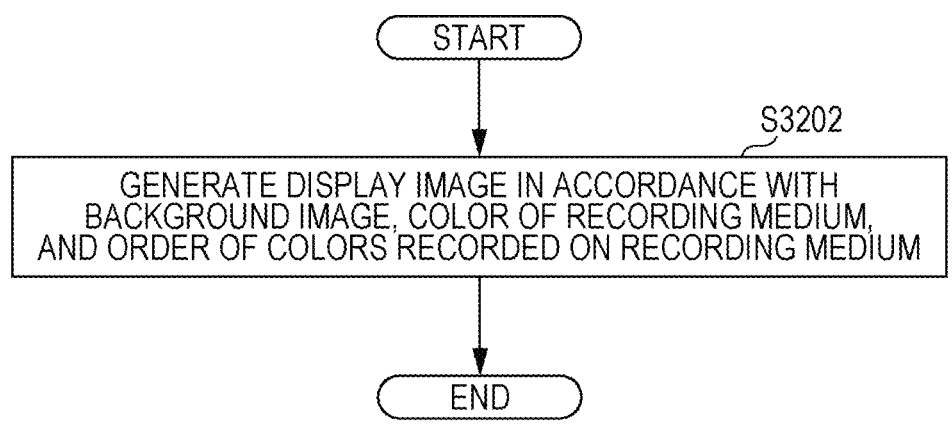
FIG. 32 is a flowchart illustrating another example of the process according to the third exemplary embodiment.

FIG. 32 is a flowchart illustrating another example of the process (an example of step S3008) according to the third exemplary embodiment.

In step S3202, a display image is generated in accordance with (1) the background image, (2) the color of the recording medium, and (3) the order of colors recorded on the recording medium. That is, a case where the recording medium subjected to printing is simulated. The order of colors recorded differs depending on the order of color materials used by the image forming apparatus 190. When a special color is used foremost and hindmost, for example, the hindmost special color, black, yellow, magenta, cyan, and the foremost special color are recorded in this order. Color blending is performed in this order of recording.

Figure 33:
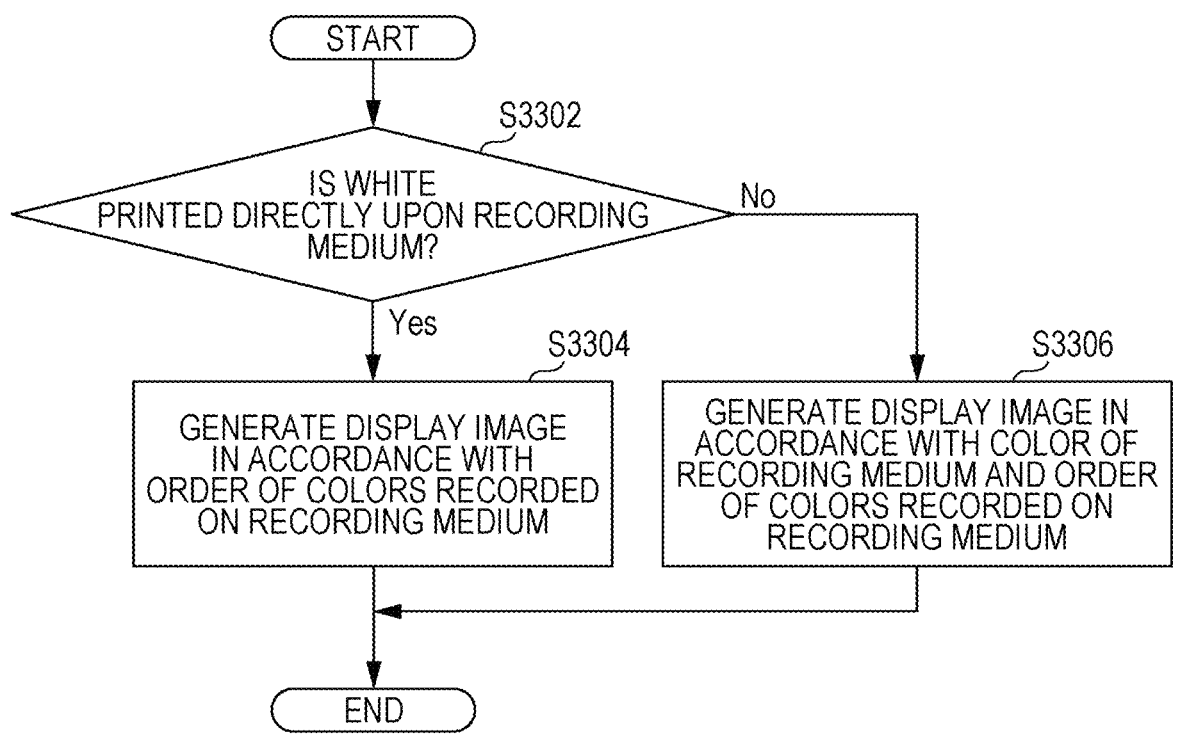
FIG. 33 is a flowchart illustrating another example of the process according to the third exemplary embodiment.

FIG. 33 is a flowchart illustrating another example of the process (an example of step S3008) according to the third exemplary embodiment.

In step S3302, whether white is printed directly upon the recording medium is determined. If so, the process proceeds to step S3304, and if not, the process proceeds to step S3306.

In step S3304, a display image is generated in accordance with the order of colors recorded on the recording medium. That is, a display image is generated without taking into consideration the color of the recording medium.

In step S3306, a display image is generated in accordance with the color of the recording medium and the order of colors recorded on the recording medium. More specifically, color blending is performed in accordance with the color of the recording medium and then the order of the color materials recorded by the image forming apparatus 190.

Figure 34:
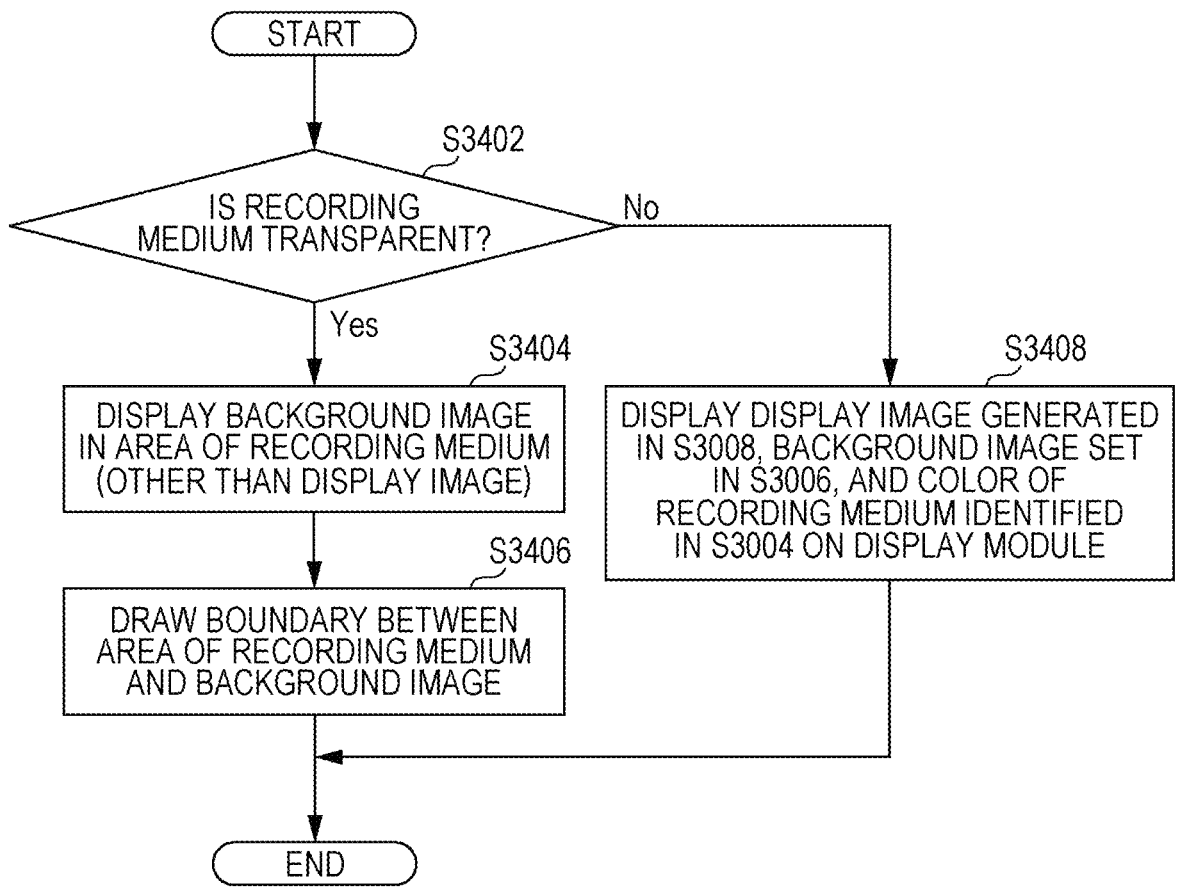
FIG. 34 is a flowchart illustrating an example of a process according to the third exemplary embodiment.

FIG. 34 is a flowchart illustrating an example of a process (an example of step S3010) according to the third exemplary embodiment.

In step S3402, whether the recording medium is transparent is determined. If so, the process proceeds to step S3404, and if not, the process proceeds to step S3408.

In step S3404, the background image is displayed in an area of the recording medium (other than the display image).

In step S3406, a boundary is drawn between the area of the recording medium and the background image. Since the recording medium is transparent, the area of the recording medium is also the background image. The user, however, might desire to know where the recording medium is located, which is a reason why an edge (i.e., the boundary) of the recording medium is drawn. The user may be able to select whether to perform step S3406. Alternatively, the edge of the recording medium may be displayed in three dimensions, instead of using the boundary line.

In step S3408, the display image generated in step S3008 (FIG. 30), the background image set in step S3006 (FIG. 30), and the color of the recording medium identified in step S3004 (FIG. 30) are displayed on the display module 120.

Figure 36:
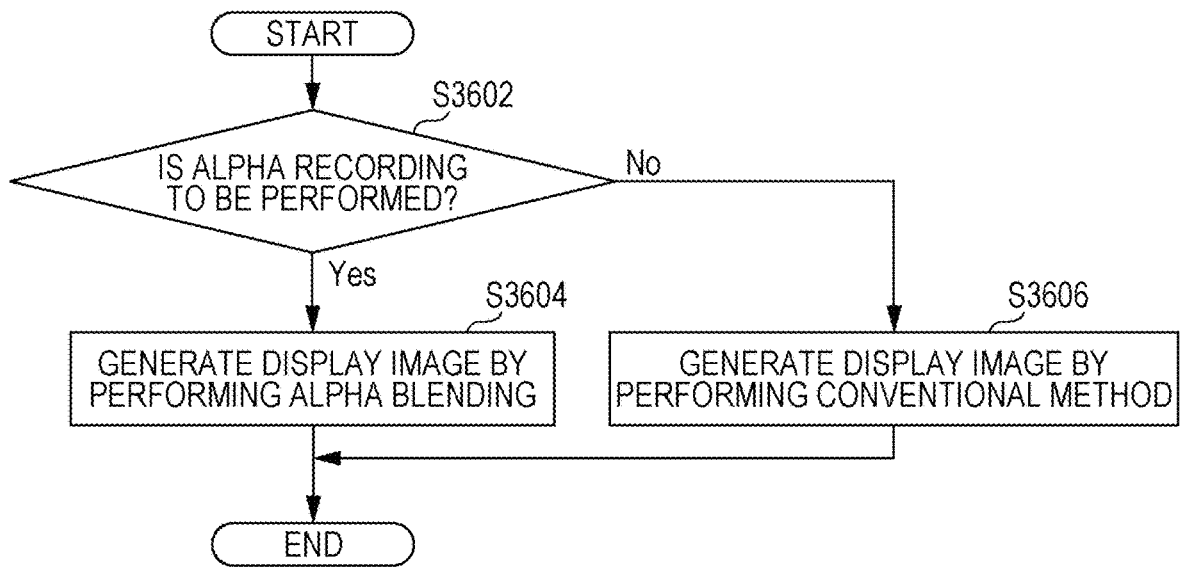
FIG. 36 is a flowchart illustrating an example of a process according to the third exemplary embodiment.
Figure 37:
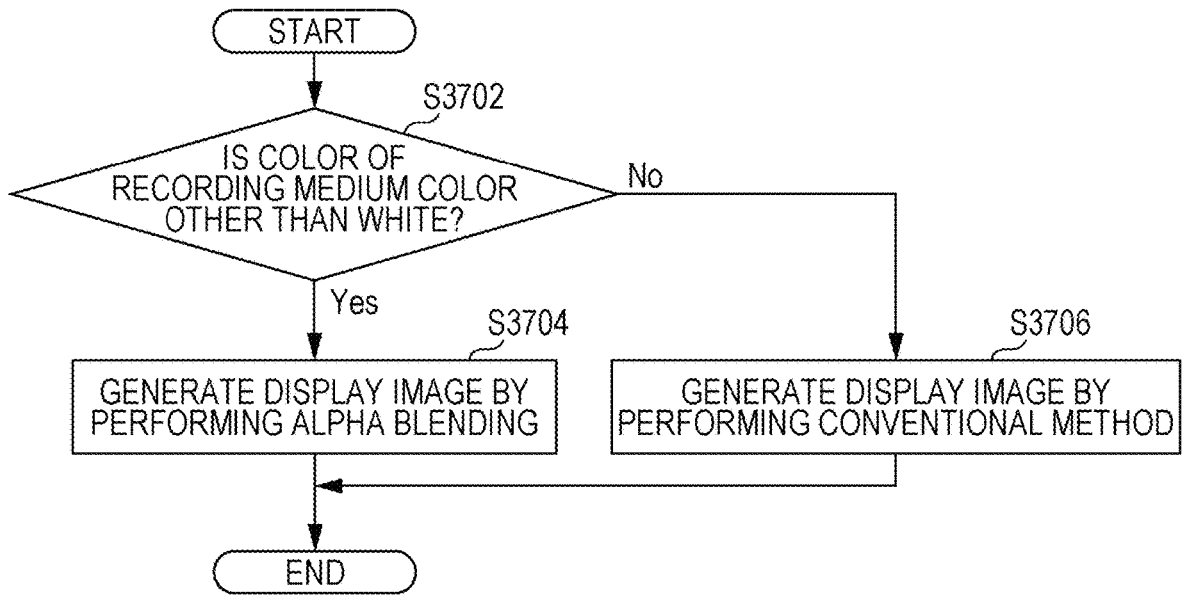
FIG. 37 is a flowchart illustrating an example of a process according to the third exemplary embodiment.

In the process for generating a display image, blending may be prevented (inhibited) as in examples illustrated in FIGS. 36 and 37.

FIG. 36 is a flowchart illustrating an example of a process according to the third exemplary embodiment.

In step S3602, the prevention module 2960 receives a user operation and determines whether to perform alpha blending. If so, the process proceeds to step S3604, and if not, the process proceeds to step S3606. The user operation may be, for example, an operation for determining whether to display an image equivalent to a print (whether to perform alpha blending). When an image equivalent to a print is to be displayed, the user may be notified that it will take longer to display the image.

In step S3604, the display image generation module 2930 generates a display image by performing alpha blending.

In step S3606, the display image generation module 2930 generates a display image by performing a conventional method.

FIG. 37 is a flowchart illustrating an example of a process according to the third exemplary embodiment.

In step S3702, the prevention module 2960 determines whether the color of the recording medium is a color other than white. If so, the process proceeds to step S3704, and if not, the process proceeds to step S3706.

In step S3704, the display image generation module 2930 generates a display image by performing alpha blending.

In step S3706, the display image generation module 2930 generates a display image by performing a conventional method. This is because when the recording medium is white, there would be little difference from a result obtained using the conventional method, in which blending is not performed, even if white blending was performed. The conventional method, therefore, is performed in order to reduce display time.

Figure 38A:
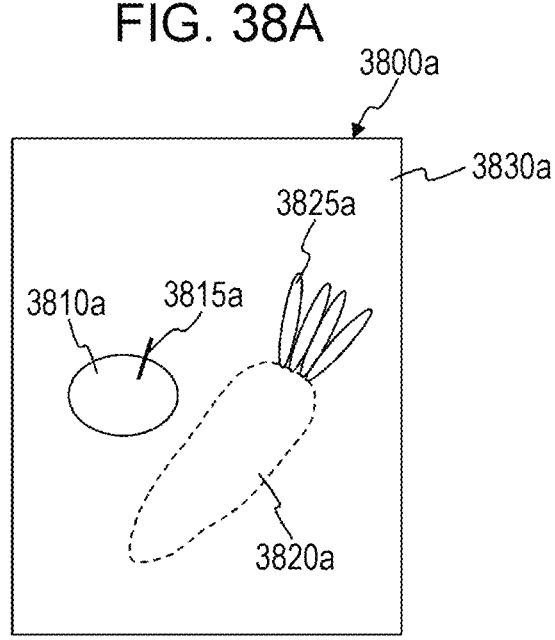
FIGS. 38A and 38B are diagrams illustrating examples of a process according to the third exemplary embodiment.
Figure 38B:
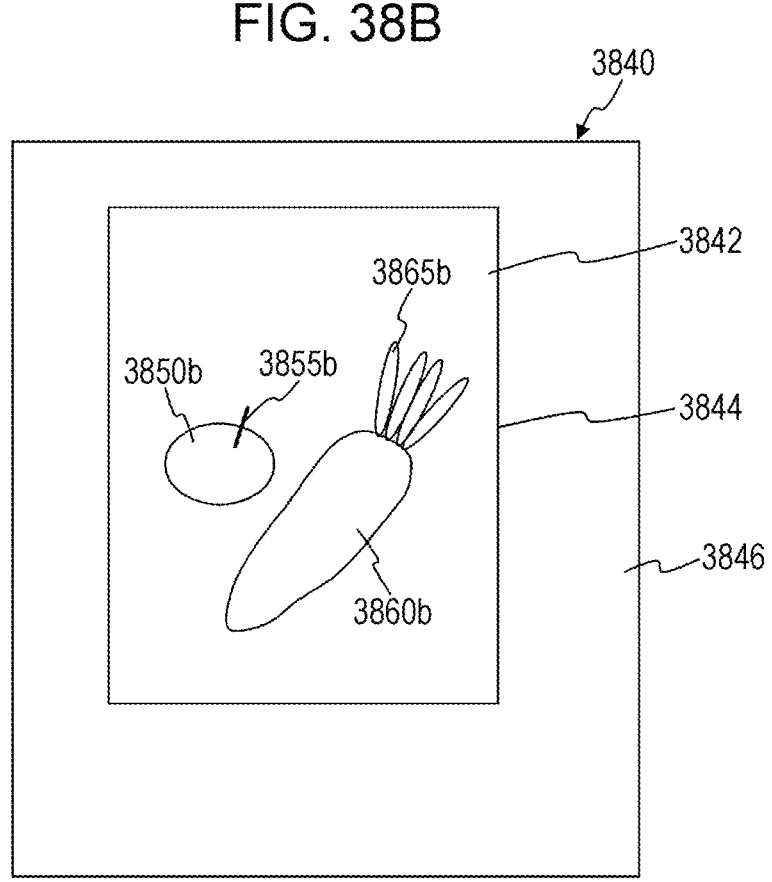

FIGS. 38A and 38B are diagrams illustrating examples of a process according to the third exemplary embodiment.

In a display image 3800a generated from print data in the example illustrated in FIG. 38A, there are a blue area 3810a, a brown area 3815a, a white area 3820a (a contour is indicated by a broken line), and a green area 3825a indicating an apple and a radish and the rest of the display image 2800a is an achromatic area 3830a.

FIG. 38B illustrates an example of a case where a recording medium is transparent. A background image 3846 is displayed all over a preview image display area 3840, and a blue area 3850b and the like are displayed upon the background image 3846. Here, color blending is performed on the background image 3846, the blue area 3850b, and the like and is not performed on a color of the recording medium. Since the recording medium is transparent, a recording medium area 3842 and the background image 3846 are not distinguished from each other. A boundary 3844 indicating an edge of the recording medium, therefore, is displayed.

Fourth Exemplary Embodiment

Figure 39:
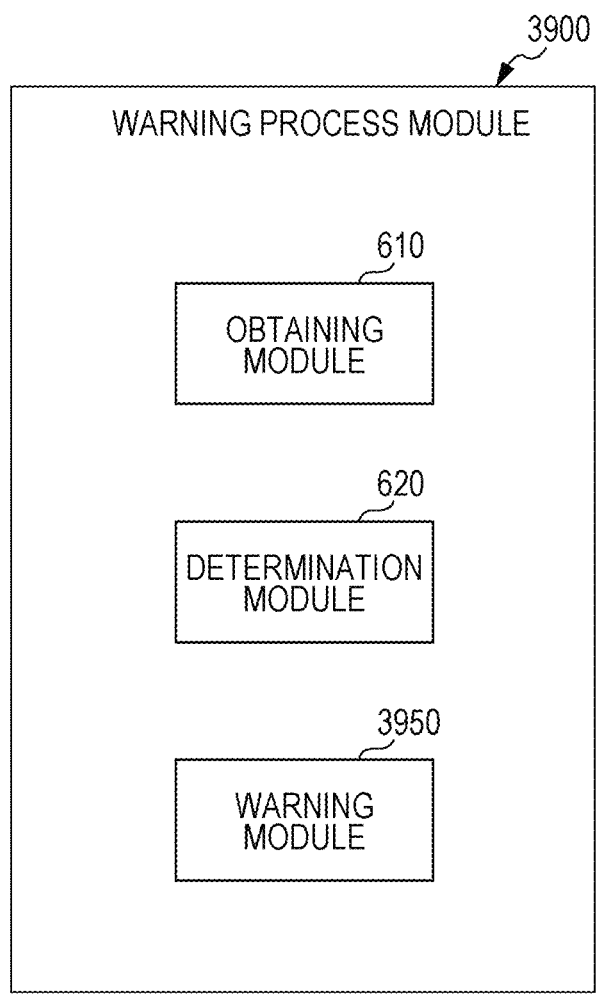
FIG. 39 is a conceptual diagram illustrating an example of modules according to a fourth exemplary embodiment.

FIG. 39 is a conceptual diagram illustrating an example of modules according to the fourth exemplary embodiment. When a preview image is displayed and it is difficult to distinguish a chromatic part including a special color and an achromatic part, for example, the user is notified that it is difficult to distinguish the chromatic part and the achromatic part.

A warning process module 3900 may be incorporated into one or some of the print job generation apparatus 180, the image processing apparatus 100, and the image forming apparatus 190.

The warning process module 3900 includes the obtaining module 610, the determination module 620, and a warning module 3950.

The obtaining module 610 obtains attribute information that specifies a process performed by the image forming apparatus 190 in accordance with a print job including print data. For example, the obtaining module 610 obtains the attribute information from the recording medium field 490 of the print job table 400.

The determination module 620 corresponds to a recording medium on which print data is to be printed and determines a display color of a drawing area in which a display image generated on the basis of the print data included in a print job is to be disposed.

The determination module 620 may determine a color of a recording medium usable in the image forming apparatus 190 as a display color of a drawing area.

The warning module 3950 issues a warning if attribute information obtained by the obtaining module 610 specifies that a predetermined color material be used and a display color of a drawing area determined by the determination module 620 is similar to a color of the predetermined color material. The predetermined color material may be a color material of one of cyan, magenta, yellow, and black, which are the basic recording colors, or a color material of a special color (white, silver, gold, etc.). In the following description, a white color material will be used as an example. A display color of a drawing area determined by the determination module 620 becomes similar to a color of a predetermined color material specified by attribute information when a color of image data and a color of a recording medium are similar to each other. The term "similar" refers to a case where two colors are the same and a case where two colors are close to each other, such as a case where white has been drawn and a color of a recording medium is grey.

A warning is issued, for example, when a print job has been created (when the print job generation apparatus 180 issues a warning), when a print job has been received (when the image processing apparatus 100 issues a warning), when a preview image of print data included in a print job is displayed (when the image processing apparatus 100 issues warning), and when printing is performed in accordance with a print job (when the image forming apparatus 190 issues a warning). If a print job is created or received as a warning, for example, it may be indicated that a color similar to a color of a recording medium is used. When a preview image is displayed, a warning image indicating a warning may be included in the preview image. When printing is performed, it may be indicated on a control panel or the like that the printing is not to be performed or that a situation is not suitable for the printing.

The warning module 3950 may issue a warning when a predetermined color material is usable in the image forming apparatus 190. The predetermine color material may be a color material of one of the basic recording colors or the special color. The predetermined color material may be, for example, a white color material.

When the warning process module 3900 is incorporated into the print job generation apparatus 180, the following process may be performed.

When a display image is displayed on a display unit (the display device 210 etc.), the warning module 3950 may display a warning image indicating a warning. The warning image may be obtained by editing the display image.

When the predetermined color material is a white color material, the warning module 3950 may change a color of pixels corresponding to a part of a display image in which the white color material is used to a color other than white.

Alternatively, when the predetermined color material is a white color material, the warning module 3950 may edit a contour of an area corresponding to a part of a display image in which the white color material is used. In a specific example, a contour line is drawn.

Figure 40:
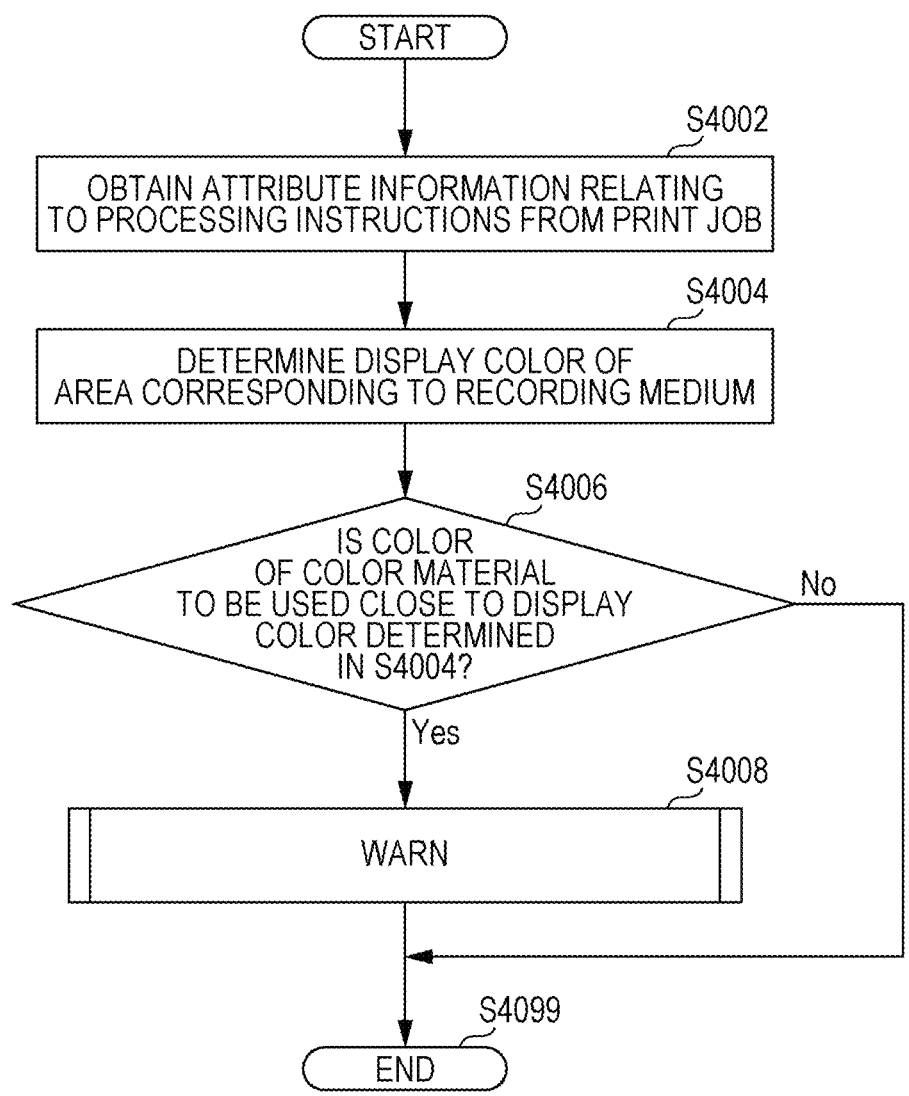
FIG. 40 is a flowchart illustrating an example of a process according to the fourth exemplary embodiment.

FIG. 40 is a flowchart illustrating an example of a process according to the fourth exemplary embodiment.

In step S4002, the obtaining module 610 obtains attribute information relating to processing instructions from a print job. The obtaining module 610 may obtain the attribute information from the specified color materials field 480 or the recording medium field 490 of the print job table 400.

In step S4004, the determination module 620 determines a display color of an area corresponding to a recording medium.

In step S4006, the warning module 3950 determines whether a color of a color material to be used and the display color determined in step S4004 are similar to each other. If so, the process proceeds to step S4008, and if not, the process ends (step S4099). As a method for determining whether the two colors are similar to each other, a table storing combinations of similar colors may be prepared, and whether a color of a color material to be used and a color of the recording medium belong to the same combination may be determined by referring to the table.

In step S4008, the warning module 3950 issues a warning. Details of step S4008 will be described later with reference to flowcharts of FIGS. 41 and 42. One of processes illustrated in FIGS. 41 and 42 may be performed, or a combination of these processes may be performed.

Figure 41:
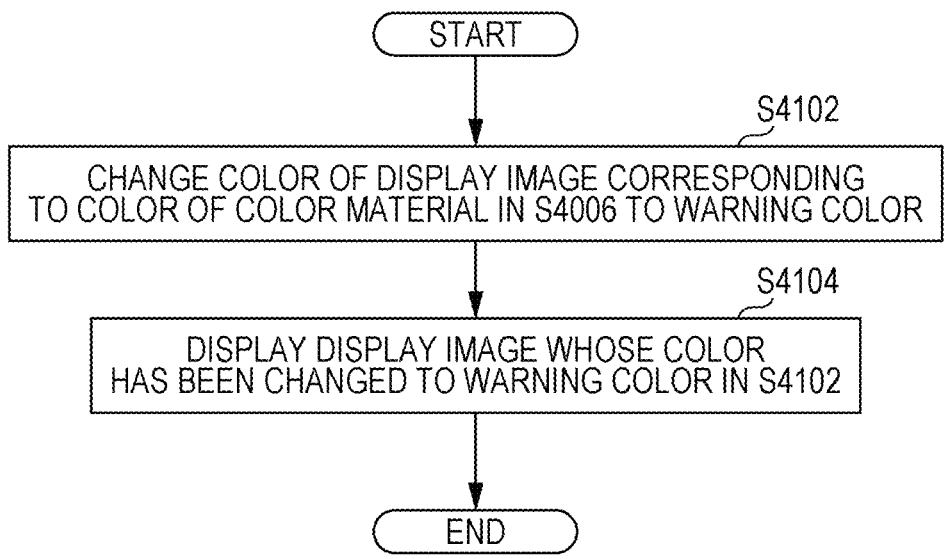
FIG. 41 is a flowchart illustrating an example of a process according to the fourth exemplary embodiment.

FIG. 41 is a flowchart illustrating an example of a process (an example of step S4008) according to the fourth exemplary embodiment. Here, an image whose color has been changed to a color (a color of a color material) similar to the color of the recording medium is used as a warning image.

In step S4102, a color of the display image corresponding to the color of the color material in step S4006 (FIG. 40) is changed to a warning color. The warning color may be, for example, a pseudo-color of the new color (the color of the color material), a reddish color, or the like. For example, white is changed to a pseudo-cream color, or white is changed to magenta.

In step S4104, the display image whose color has been changed to the warning color in step S4102 is displayed. Alternatively, the color of the color material and the warning color (or a first warning color (e.g., magenta etc.) and a second warning color (e.g., yellow etc.)) may be alternately displayed in a blinking manner. The two colors may be displayed in a blinking manner by generating images using the two colors and switching the generated images at predetermined time intervals.

Figure 42:
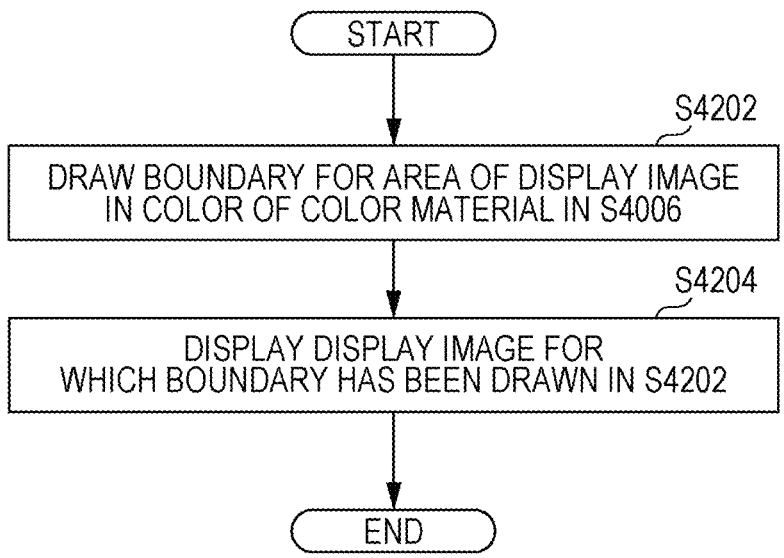
FIG. 42 is a flowchart illustrating another example of the process according to the fourth exemplary embodiment.

FIG. 42 is a flowchart illustrating another example of the process (an example of step S4008) according to the fourth exemplary embodiment. Here, an image in which a contour line is drawn for a color (a color of a color material) similar to the color of the recording medium is used as a warning image.

In step S4202, a boundary is drawn for an area of a color of the display image corresponding to the color of the color material in step S4006 (FIG. 40).

In step S4204, the display image for which the boundary has been drawn in step S4202 is displayed.

Figure 43A:
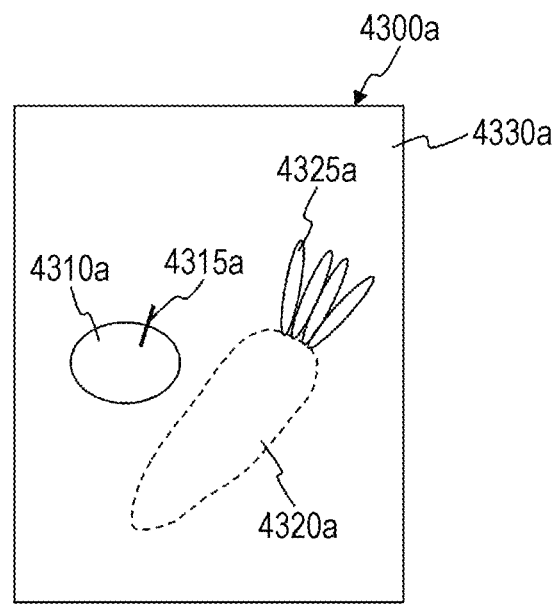
FIGS. 43A to 43C are diagrams illustrating examples of a process according to the fourth exemplary embodiment.
Figure 43B:
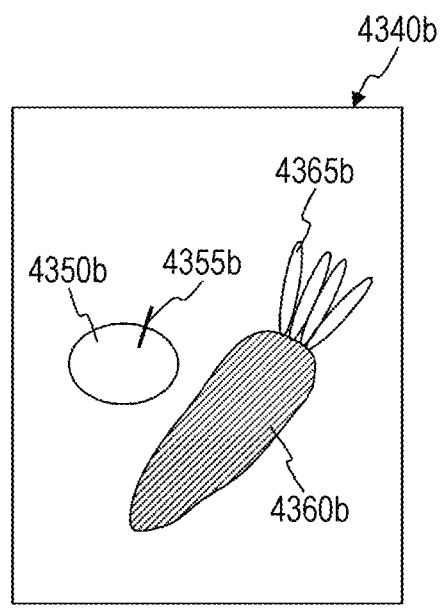
Figure 43C:
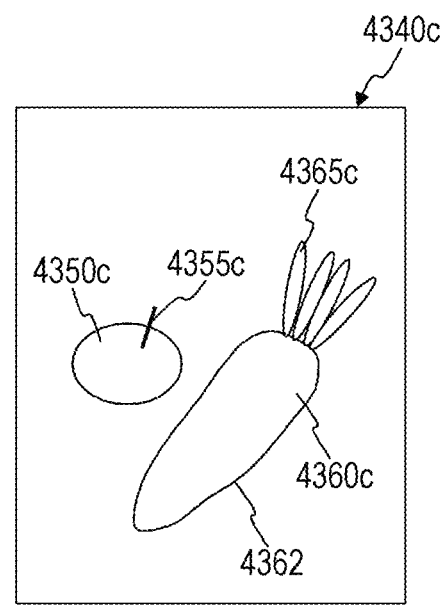

FIGS. 43A to 43C are diagrams illustrating examples of a process according to the fourth exemplary embodiment.

In a display image 4300a generated from print data in the example illustrated in FIG. 43A, there are a blue area 4310a, a brown area 4315a, a white area 4320a (a contour is indicated by a broken line), and a green area 4325a indicating an apple and a radish and the rest of the display image 4300a is an achromatic area 4330a. When a preview image of the display image 4300a is displayed after a white recording medium is determined, for example, there are the following two warning images.

In the example illustrated in FIG. 43B, a background of a drawing area 4340b is determined as white, and the white area 4320a has been changed to, for example, a magenta warning area 4360b.

In the example illustrated in FIG. 43C, a background of a drawing area 4340c is determined as white, and the white area 4320a has been changed to a white area 4360c for which a contour line 4362 has been drawn. In addition, the inside of the white area 4360c may be changed to a warning color such as magenta.

FIG. 44 illustrates an example of the hardware configuration of the image processing apparatus 100, the print job generation apparatus 180, and the image forming apparatus 190 according to the exemplary embodiments. The configuration illustrated in FIG. 44 is achieved, for example, by a personal computer (PC). The hardware configuration includes a data reading unit 4417 such as a scanner and a data output unit 4418 such as a printer.

A CPU 4401 is a control unit that performs processes according to a computer program describing execution sequences of various modules described in the above exemplary embodiments, that is, the print job reception module 105, the preview image display module 110, the user operation reception module 115, the display module 120, the image forming apparatus communication module 125, the obtaining module 610, the determination module 620, the display image generation module 630, the display control module 640, the identification module 1910, the determination module 1920, the display image generation module 1930, the boundary generation module 1950, the prevention module 1960, the identification module 2910, the setting module 2920, the display image generation module 2930, the display control module 2940, the boundary image generation module 2950, the prevention module 2960, the warning process module 3900, and the warning module 3950.

A read-only memory (ROM) 4402 stores programs, arithmetic parameters, and the like used by the CPU 4401. A RAM 4403 stores programs used by the CPU 4401 in operation, parameters that can change during the operation of the CPU 4401, and the like. These components are connected to one another by a host bus 4404 such as a CPU bus.

The host bus 4404 is connected to an external bus 4406 such as a peripheral component interconnect/interface (PCI) bus through a bridge 4405.

A keyboard 4408 and a pointing device 4409 such as a mouse are devices operated by the user. A display 4410 is a liquid crystal display or a cathode ray tube (CRT) and displays various pieces of information as text and image information. Alternatively, a touch screen, which has functions of both the pointing device 4409 and the display 4410, may be used, instead. In this case, a keyboard need not be physically connected like the keyboard 4408. A function of a keyboard may be achieved by displaying a keyboard on a screen (touch screen) in a software manner (a so-called "software keyboard" or "screen keyboard").

A hard disk drive (HDD) 4411 includes a hard disk (may be a flash memory or the like), drives the hard disk, and records and plays back programs and information executed by the CPU 4401. The hard disk stores the print job table 400, the image forming apparatus information table 500, the recording medium table 3500, print data, drawn images, and the like. The hard disk also stores various other pieces of data, various computer programs, and the like.

A drive 4412 reads data or a program recorded in a removable recording medium 4413 inserted thereinto, such as a magnetic disk, an optical disc, a magneto-optical (MO) disk, or a semiconductor memory, and supplies the data or the program to the RAM 4403 through an interface 4407, the external bus 4406, the bridge 4405, and the host bus 4404. The removable recording medium 4413 may also be used as a data recording area.

A connection port 4414 is a port for connecting an external device 4415 and has a connection such as a universal serial bus (USB) port or an Institute of Electrical and Electronics Engineers (IEEE) 1394 port. The connection port 4414 is connected to the CPU 4401 and the like through the interface 4407, the external bus 4406, the bridge 4405, the host bus 4404, and the like. A communication unit 4416 is connected to a communication line and performs data communication with the outside. The data reading unit 4417 is a scanner, for example, and reads documents. The data output unit 4418 is a printer, for example, and outputs document data.

The hardware configuration of the image processing apparatus 100, the print job generation apparatus 180, and the image forming apparatus 190 illustrated in FIG. 44 is an example, and the exemplary embodiments are not limited to the configuration illustrated in FIG. 44, insofar as the modules described in the exemplary embodiments can be achieved. For example, some modules may be achieved by dedicated hardware (e.g., an application-specified integrated circuit (ASIC) etc.), and other modules may be located in an external system and connected through a communication line. Plural systems illustrated in FIG. 44 may be connected to one another by a communication line and operate in combination with one another. The system illustrated in FIG. 44 may be incorporated into a PC, a robot, a copier, a fax machine, a scanner, a printer, a multifunction peripheral (an image processing apparatus having functions of two or more of a scanner, a printer, a copier, a fax machine, and the like), or the like. The print job generation apparatus 180 may be a mobile information communication device (a mobile phone, a smartphone, a mobile device, a wearable computer, etc.) or an information home appliance.

The above-described program may be stored in a recording medium and provided, or may be provided through a communication unit. In this case, the above-described program may be regarded, for example, as an invention of a non-transitory computer readable medium storing a program.

The non-transitory computer readable medium storing a program refers to a non-transitory computer readable medium storing a program used to install, execute, and distribute the program.

The non-transitory computer readable medium may be, for example, digital versatile disc (DVD)-R, a DVD-RW, a DVD-RAM, or the like specified by a DVD forum, a DVD+R, a DVD+RW, or the like specified by DVD+RW, a compact disc read-only memory (CD-ROM), a CD-recordable (CD-R), a CD-rewritable (CD-RW), a Blu-ray Disc (BD; registered trademark), an MO disk, a flexible disk (FD), a magnetic tape, a hard disk, a ROM, an electrically erasable programmable read-only memory (EEPROM), a flash memory, a RAM, a secure digital (SD) memory card, or the like.

The entirety or a part of the program may be recorded in the non-transitory computer readable medium and preserved or distributed. The program may be transferred through a wired network or a wireless network used for a local area network (LAN), a metropolitan area network (MAN), a wide area network (WAN), the Internet, an intranet, an extranet, or the like or a transfer medium such as a combination of these networks. Alternatively, the program may be transmitted on carrier waves.

Furthermore, the program may be a part or the entirety of another program, or may be recorded in a recording medium along with another program. Alternatively, the program may be divided and recorded in plural recording media. In addition, the program may be compressed, encrypted, or recorded in any other mode insofar as the program can be restored.

The second exemplary embodiment may be defined as follows.

For example, there is the following problem.

Print data included in a print job is processed to generate a preview image. The preview image is displayed on a display device, and an image to be printed is checked before printing. In this case, the preview image is disposed in a white drawing area corresponding to a recording medium such as a recording sheet.

A color of a recording medium is not necessarily white and might affect a color of an image to be printed. Because a conventional preview image is generated while assuming that a recording medium is white, an effect of a color of the recording medium is not taken into consideration.

The present invention provides an image processing apparatus and a non-transitory computer readable medium capable of generating a preview image that takes into consideration a color of a recording medium.

[B1] An image processing apparatus including:
an obtaining unit that obtains attribute information that specifies a process performed by an image forming apparatus in accordance with a print job including print data;
an identification unit that identifies a color of a recording medium specified by the attribute information;
a generation unit that generates a display image on the basis of the color of the recording medium identified by the identification unit and the print data included in the print job; and
a determination unit that determines, as the color of the recording medium identified by the identification unit, a display color of a drawing area which corresponds to an area of the recording medium for printing the print data and in which the display image generated by the generation unit is to be disposed.

[B2] The image processing apparatus according to [B1],
in which the identification unit identifies a color of a recording medium usable in the image forming apparatus.

[B3] The image processing apparatus according to [B2],
in which, if the color of the recording medium identified by the identification unit is not transparent, the generation unit generates the display image on the basis of the color of the recording medium and the print data.

[B4] The image processing apparatus according to [B1],
in which the generation unit generates the display image in predetermined order.

[B5] The image processing apparatus according to [B4],
in which, if a color recorded directly upon the recording medium is white, the generation unit generates the display image on the basis of the print data regardless of the color of the recording medium.

[B6] The image processing apparatus according to [B4],
in which the generation unit generates a first image including basic recording colors of the image forming apparatus and a second image including a special color different from the basic recording colors and then generates the display image by sequentially blending the first and second images with the color of the recording medium in predetermined order.

[B7] The image processing apparatus according to [B6],
in which the predetermine order is order of colors recorded by the image forming apparatus.

[B8] The image processing apparatus according to [B1], further including:
a boundary generation unit that generates, on an image part whose color recorded on the recording medium is white, a boundary between the recording medium and the image part.

[B9] The image processing apparatus according to [B1], further including:
a prevention unit that prevents the generation unit from generating a display image using the color of the recording medium.

[B10] The image processing apparatus according to [B9],
in which the prevention unit prevents blending based on the first and second images and the color of the recording medium.

[B11] A non-transitory computer readable medium storing a program causing a computer to execute a process for processing an image, the process including:
obtaining attribute information that specifies a process performed by an image forming apparatus in accordance with a print job including print data;
identifying a color of a recording medium specified by the attribute information;
generating a display image on the basis of the color of the recording medium identified in the identifying and the print data included in the print job; and
determining, as the color of the recording medium identified in the identifying, a display color of a drawing area which corresponds to an area of the recording medium for printing the print data and in which the display image generated in the generating is to be disposed.

The above-described invention produces the following effects.

With the image processing apparatus according to [B1], a preview image that takes into consideration a color of a recording medium is generated.

With the image processing apparatus according to [B2], a color of a recording medium usable in the image forming apparatus is identified.

With the image processing apparatus according to [B3], if a recording medium is not transparent, a display image is generated on the basis of a color of the recording medium and print data.

With the image processing apparatus according to [B4], a display image is degenerated in predetermined order.

With the image processing apparatus according to [B5], if a color recorded directly upon a recording medium is white, a display image is generated on the basis of print data regardless of a color of the recording medium.

With the image processing apparatus according to [B6], a first image including basic recording colors and a second image including a special color are blended in predetermined order to generate the display image.

With the image processing apparatus according to [B7], order of colors recorded by the image forming apparatus is used as the predetermined order.

With the image processing apparatus according to [B8], a boundary between a recording medium and a white image part is generated on the white image part.

With the image processing apparatus according to [B9], generation of a display image using a color of a recording medium is prevented.

With the image processing apparatus according to [B10], transparent blending based on first and second images and a color of a recording medium is prevented.

With the non-transitory computer readable medium according to [B11], a preview image that takes into consideration a color of a recording medium is generated.

The third exemplary embodiment may be defined as follows.

For example, there is the following problem.

Print data included in a print job is processed to generate a preview image. The preview image is displayed on a display device, and an image to be printed is checked before printing. In this case, a color of a recording medium is assumed to be white, and the preview image is disposed in a white drawing area.

A recording medium, however, is not necessarily white and a color of the recording medium might affect a color of a printed image. In addition, a material of a recording medium might not be paper but cloth or transparent film. Since a recording medium is assumed to be white when a conventional preview image is generated, effects of a color and a material of the recording medium upon the preview image are not taken into consideration.

The present invention provides an image processing apparatus and a non-transitory computer readable medium capable of generating a preview image that takes into consideration a color (or a material) of a recording medium.

[C1] An image processing apparatus including:
a display control unit that displays, on a display unit, a first area, in which a display image generated from print data included in a print job subjected to printing performed by an image forming apparatus is to be disposed, a second area, which corresponds to a recording medium on which an image to be printed corresponding to the display image is recorded and in which the display image is to be disposed, and a third area, which corresponds to a background of the recording medium and includes the second area;
an identification unit that identifies a color of the recording medium specified by attribute information that specifies a process performed by the image forming apparatus in accordance with the print job;
a setting unit that sets a background image of the recording medium; and
a generation unit that generates the display image using the color of the recording medium identified by the identification unit, the background image set by the setting unit, and the print data.

[C2] The image processing apparatus according to [C1], in which the identification unit identifies a color of a recording medium usable in the image forming apparatus.

[C3] The image processing apparatus according to [C2], in which, if the color of the recording medium identified by the identification unit is not transparent, the generation unit generates the display image on the basis of the color of the recording medium and the print data.

[C4] The image processing apparatus according to [C2], in which, if the color of the recording medium identified by the identification unit is transparent, the generation unit generates the display image on the basis of the background image set by the setting unit and the print data.

[C5] The image processing apparatus according to [C3], in which the generation unit generates the display image in predetermined order.

[C6] The image processing apparatus according to [C5], in which the predetermine order is order of colors recorded by the image forming apparatus.

[C7] The image processing apparatus according to [C2], in which, if a color recorded directly upon the recording medium is white, the generation unit generates the display image on the basis of the print data regardless of the color of the recording medium.

[C8] The image processing apparatus according to [C1], in which, if the recording medium is transparent, the display control unit displays an image obtained by using the background image in the second area other than the first area.

[C9] The image processing apparatus according to [C8], in which the display control unit edits the background image before displaying the background image.

[C10] The image processing apparatus according to [C8], in which the display control unit also displays an image indicating a boundary between the second and third areas.

[C11] The image processing apparatus according to [C8], further including:
a selection unit that selects that the image indicating the boundary is to be displayed.

[C12] The image processing apparatus according to [C8], in which the background image is a uniform chromatic image.

[C13] The image processing apparatus according to [C1], in which the color of the recording medium is associated with a material of the recording medium.

[C14] The image processing apparatus according to [C1], further including:
a prevention unit that prevents the generation unit from generating the display image using the color of the recording medium and the background image.

[C15] The image processing apparatus according to [C14], in which the prevention unit prevents blending in which an image based on the print data, an image including the color of the recording medium, and the background image are used.

[C16] A non-transitory computer readable medium storing a program causing a computer to execute a process for processing an image, the process including:
displaying, on a display unit, a first area, in which a display image generated from print data included in a print job subjected to printing performed by an image forming apparatus is to be disposed, a second area, which corresponds to a recording medium on which an image to be printed corresponding to the display image is recorded and in which the display image is to be disposed, and a third area, which corresponds to a background of the recording medium and includes the second area;
identifying a color of the recording medium specified by attribute information that specifies a process performed by the image forming apparatus in accordance with the print job;
setting a background image of the recording medium; and
generating the display image using the color of the recording medium identified in the identifying, the background image set in the setting, and the print data.

The above-described invention produces the following effects.

With the image processing apparatus according to [C1], a preview image that takes into consideration a color or a material of a recording medium is generated.

With the image processing apparatus according to [C2], a color of a recording medium usable in the image forming apparatus is identified.

With the image processing apparatus according to [C3], if a recording medium is not transparent, a display image is generated on the basis of the color of the recording medium and print data.

With the image processing apparatus according to [C4], if a recording medium is transparent, a display image is generated on the basis of a background image and print data.

With the image processing apparatus according to [C5], a display image is generated in predetermined order.

With the image processing apparatus according to [C6], order of colors recorded by the image forming apparatus is used as the predetermined order.

With the image processing apparatus according to [C7], if a color recorded directly upon a recording medium is white, a display image is generated on the basis of print data regardless of a color of the recording medium.

With the image processing apparatus according to [C8], if a recording medium is transparent, an image obtained by using which a background image in the second area other than the first area is displayed.

With the image processing apparatus according to [C9], a background image is edited before being displayed.

With the image processing apparatus according to [C10], an image indicating a boundary between the second area and the third area is also displayed.

With the image processing apparatus according to [C11], it is selected that an image indicating a boundary is to be displayed.

With the image processing apparatus according to [C12], a uniform chromatic image is used as a background image.

With the image processing apparatus according to [C13], a color of a recording medium is associated with a material of the recording medium.

With the image processing apparatus according to [C14], generation of a display image using a color of a recording medium and a background image is prevented.

With the image processing apparatus according to [C15], blending in which an image based on print data, an image including a color of a recording medium, and a background image are used is prevented.

With the non-transitory computer readable medium according to [C16], a preview image that takes into consideration a color (or a material) of a recording medium is generated.

The fourth exemplary embodiment may be defined as follows.

For example, there is the following problem.

In a process for generating image data performed by an image forming apparatus, a color of white has been expressed without using color materials (subtractive color mixing of CMYK) (with recording pixel values of white set to 0, that is, with a so-called "blank"), and a color of a recording medium (recording sheet) has been used. In a monitor image (preview image) of such an image to be recorded, therefore, a white part and a color of a recording medium (where a ground is exposed) are both displayed as white.

By using a special color such as white toner, white letters on a colored background, for example, can be expressed as a result of drawing, not as "blanks". When a color of a recording medium that serves as a ground is white and a monitor image is displayed through simulation, it is difficult to distinguish a part specified as white and a part in which the ground is exposed. Such a phenomenon can occur not only in the case of white but also when a special color and a color of a recording medium are the same or similar to each other.

The present invention provides an image processing apparatus and a non-transitory computer readable medium capable of notifying a user that it is difficult to distinguish, in a preview image for checking a state of an image to be recorded, a chromatic part including a special color and an achromatic part.

[D1] An image processing apparatus including:
an obtaining unit that obtains attribute information that specifies a process performed by an image forming apparatus in accordance with a printing job including print data;
a determination unit that determines a display color of a drawing area which corresponds to an area of a recording medium for printing print data and in which a display image generated on the basis of the print data included in the print job is to be disposed; and
a warning unit that issues a warning if the attribute information specifies that a predetermined color material be used and the display color of the drawing area determined by the determination unit is similar to a color of the color material.

[D2] The image processing apparatus according to [D1], in which the determination unit determines a color of a recording medium usable in the image forming apparatus as the display color of the drawing area.

[D3] The image processing apparatus according to [D2], in which the warning unit issues the warning if the predetermined color material is usable in the image forming apparatus.

[D4] The image processing apparatus according to [D1], in which, if the display image is displayed on a display unit, the warning unit displays a warning image indicating the warning.

[D5] The image processing apparatus according to [D4], in which the warning image is obtained by editing the display image.

[D6] The image processing apparatus according to [D5], in which the predetermined color material is a white color material, and
in which the warning image is obtained by changing a color of pixels corresponding to a part of the display image in which the white color material is used to a color other than white.

[D7] The image processing apparatus according to [D5], in which the predetermined color material is a white color material, and
in which the warning image is obtained by editing a contour of an area corresponding to a part of the display image in which the white color material is used.

[D8] A non-transitory computer readable medium storing a program causing a computer to execute a process for processing an image, the process including:
obtaining attribute information that specifies a process performed by an image forming apparatus in accordance with a printing job including print data;
determining a display color of a drawing area which corresponds to an area of a recording medium for printing print data and in which a display image generated on the basis of the print data included in the print job is to be disposed; and
issuing a warning if the attribute information specifies that a predetermined color material be used and the display color of the drawing area determined in the determining is similar to a color of the color material.

The above-described invention produces the following effects.

With the image processing apparatus according to [D1], a user is notified that it is difficult to distinguish, in a preview image, a chromatic part including a special color and an achromatic part.

With the image processing apparatus according to [D2], a color of a recording medium usable in the image forming apparatus is used as a display color of a drawing area.

With the image processing apparatus according to [D3], a warning is issued if the predetermined color material is usable in the image forming apparatus.

With the image processing apparatus according to [D4], a warning image indicating a warning is displayed if a display image is displayed on a display unit.

With the image processing apparatus according to [D5], a warning image is obtained by editing a display image.

With the image processing apparatus according to [D6], a white color material is specified, and an image obtained by changing a color of pixels corresponding to a part of a display image in which the white color material is used to a color other than white is used as a warning image.

With the image processing apparatus according to [D7], a white color material is specified, and an image obtained by editing a contour of an area corresponding to a part of a display image in which the white color material is used is used as a warning image.

With the non-transitory computer readable medium according to [D8], a user is notified that it is difficult to distinguish, in a preview image, a chromatic part including a special color and an achromatic color.

Some of the above-described first, second, third, and fourth exemplary embodiments may be combined with each other. For example, the configuration illustrated in FIG. 6 and the configuration illustrated in FIG. 19 may be combined with each other, the configuration illustrated in FIG. 6, the configuration illustrated in FIG. 19, and the configuration illustrated in FIG. 29 may be combined with one another, or the configuration illustrated in FIG. 6, the configuration illustrated in FIG. 19, the configuration illustrated in FIG. 29, and the configuration illustrated in FIG. 39 may be combined with one another.

The inventions described in [B], [C], and [D], therefore, may be combined with one another to achieve the invention described in the claims.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
obtain attribute information that specifies a process performed by an image forming apparatus in accordance with a print job including print data, wherein the attribute information is a property of a print job;
generate a display image on a basis of the print data included in the print job; and
determine a display color of a drawing area which corresponds to an area of a recording medium for printing the print data and in which the display image generated is to be disposed,
wherein the processor selects the display color of the drawing area as a color other than white in response to the attribute information specifying a white color material be used by the image forming apparatus for the print job and in response to the attribute information specifying the recording medium being white.

2. The image processing apparatus according to claim 1, wherein the processor selects the display color of the drawing area as a color other than white in response to the white color material being available in the image forming apparatus.

3. The image processing apparatus according to claim 1, wherein the selected display color is a predetermined color.

4. The image processing apparatus according to claim 3, wherein the predetermined color selected by the processor is black.

5. The image processing apparatus according to claim 1, wherein the processor is further configured to obtain a color of the recording medium specified by the attribute information,
wherein the processor selects the display color of the drawing area as the color of the recording medium in response to the attribute information specifying the white color material be used by the image forming apparatus for the print job and in response to the attribute information specifying the color of the recording medium is different from white.

6. A non-transitory computer readable medium storing a program causing a computer to execute a process for processing an image, the process comprising:
obtaining attribute information that specifies a process performed by an image forming apparatus in accordance with a print job including print data, wherein the attribute information is a property of a print job;
generating a display image on a basis of the print data included in the print job; and
selecting a display color of a drawing area which corresponds to an area of a recording medium for printing the print data and in which the display image generated is to be disposed,
wherein the display color of the drawing area as a color other than white is selected in response to the attribute information specifying a white color material be used by the image forming apparatus for the print job and in response to the attribute information specifying the recording medium being white.

7. An image processing apparatus comprising:
first obtaining means for obtaining attribute information that specifies a process performed by an image forming apparatus in accordance with a print job including print data, wherein the attribute information is a property of a print job;
generation means for generating a display image on a basis of the print data included in the print job; and
determination means for selecting a display color of a drawing area which corresponds to an area of a recording medium for printing the print data and in which the display image generated is to be disposed,
wherein the determination means selects the display color of the drawing area as a color other than white in response to the attribute information specifying a white color material be used by the image forming apparatus for the print job and in response to the attribute information specifying the recording medium being white.

* * * * *